United States Patent
Sirosh

(10) Patent No.: US 6,226,408 B1
(45) Date of Patent: May 1, 2001

(54) UNSUPERVISED IDENTIFICATION OF NONLINEAR DATA CLUSTER IN MULTIDIMENSIONAL DATA

(75) Inventor: Joseph Sirosh, Del Mar, CA (US)

(73) Assignee: HNC Software, Inc., San Diego, CA (US)

( * ) Notice: Subject to any disclaimer, the term of this patent is extended or adjusted under 35 U.S.C. 154(b) by 0 days.

(21) Appl. No.: 09/240,403

(22) Filed: Jan. 29, 1999

(51) Int. Cl.[7] .................................................. G06K 9/62
(52) U.S. Cl. ........................ 382/224; 382/156; 382/197; 382/224; 382/253; 706/15; 706/20; 706/25; 704/259
(58) Field of Search ........................... 382/110, 155–157, 382/159–160, 190, 197–198, 209, 224–229; 706/14–17, 20, 25–27; 704/6–7, 9–10, 259; 707/3–6

(56) References Cited

U.S. PATENT DOCUMENTS

| | | | |
|---|---|---|---|
| 5,590,218 | * 12/1996 | Ornstein | 382/157 |
| 5,649,070 | * 7/1997 | Connell et al. | 706/14 |
| 5,671,293 | * 9/1997 | Niki | 382/224 |
| 5,675,710 | * 10/1997 | Lewis | 706/12 |
| 5,796,631 | * 8/1998 | Iancu et al. | 713/340 |
| 5,802,507 | * 9/1998 | Gentric et al. | 706/25 |
| 5,809,490 | * 9/1998 | Guiver et al. | 706/16 |
| 6,047,277 | * 4/2000 | Parry et al. | 706/20 |
| 6,049,793 | * 4/2000 | Tomita | 706/17 |
| 6,100,901 | * 8/2000 | Mohda et al. | 345/440 |
| 6,104,835 | * 8/2000 | Han | 382/225 |

OTHER PUBLICATIONS

M.A. Upal and E. Neufeld, "Comparison of Unsupervised Classifiers," Proceedings of the First International Conference on Information, Statistics and Induction in Science, World Scientific, Melbourne, Australia, 1996, pp. 342–353.

Upal, Afzal, "Monte Carlo Comparison of Non–Hierarchical Unsupervised Classifiers", MSc Thesis, Department of Computer Science, University of Saskatchewan, 1995.

Martinez, T. and Schulten, K., "Topology Representing Networks", *Neural Networks*, vol. 7, No. 3, pp. 507–522, 1994.

Martinez, T.M., Berkovich, S.G., and Schulten, K.J., "Neural–Gas Network for Vector Quantization and its Application to Time–Series Prediction," *IEEE Transactions on Neural Networks*, vol. 4, No. 5, pp. 558–569, Jul., 1993.

Sirosh, J., "The Batch Neural Gas Clustering Algorithm," *HNC Software, Inc.*, Feb. 7, 1997.

"DataBase Mining® Marksman User Guide," *HNC Software, Inc.*, pp. 6–14, Jun., 1998.

* cited by examiner

Primary Examiner—Leo H. Boudreau
Assistant Examiner—Gregory Desiré
(74) Attorney, Agent, or Firm—Fenwick & West LLP

(57) ABSTRACT

A system, method, and software product provide for unsupervised identification of complex, nonlinear subspaces in high dimensional data. The system includes a vector quantization module, a weighted topology representing graph module, and an encoding module. The vector quantization module takes vector data inputs and extracts a group of inputs about a number of cluster centers, using a globally optimized clustering process. The weighted topology representing graph module creates a weighted graph of the vector space, using the cluster centers as nodes, weighting edges between nodes as a function of the density of the vectors between the linked nodes. The encoding module uses the weighted graph to recode the input vectors based on their proximity to the cluster centers and the connectedness of the graph. The recoded vectors are reinput into the vector quantization module, and the process repeated until termination, for example at a limited number of cluster centers. Upon termination, the clusters thus identified may be highly nonlinear in the original data space.

13 Claims, 17 Drawing Sheets

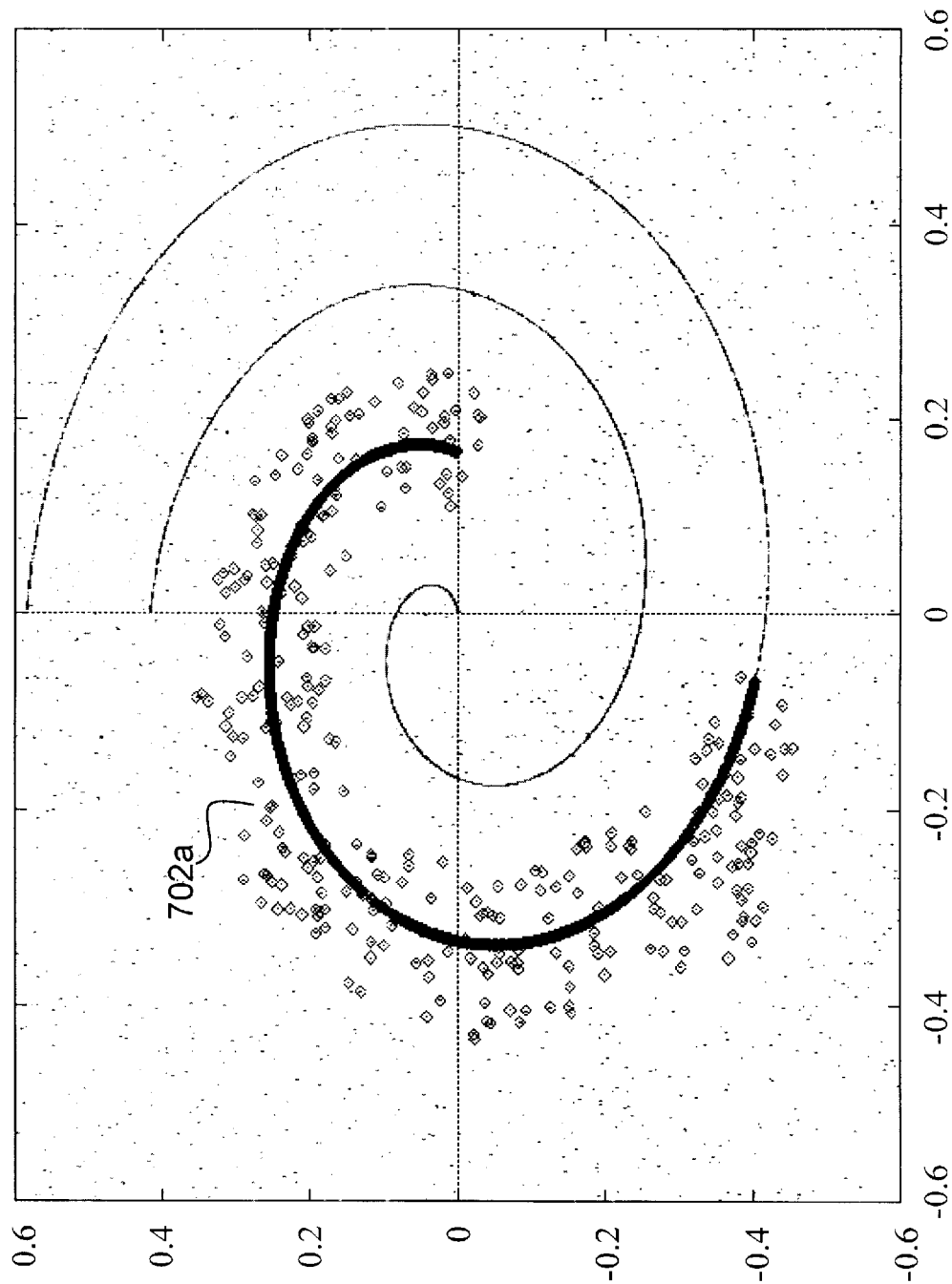

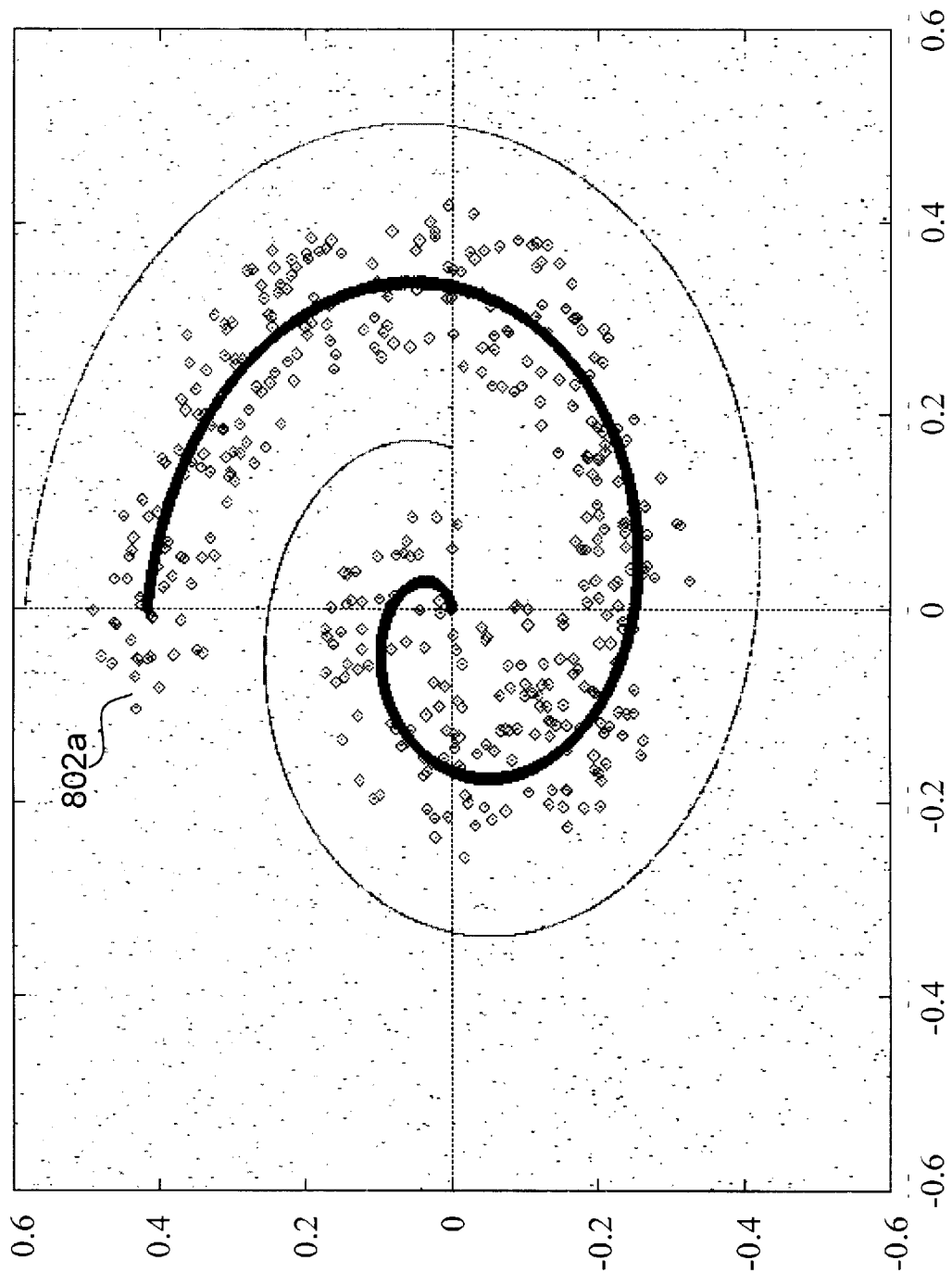

UNSUPERVISED IDENTIFICATION OF NONLINEAR DATA CLUSTER IN MULTIDIMENSIONAL DATA

BACKGROUND

1. Field of Invention

The present invention relates generally to data processing systems, and more particularly to data processing systems for data mining, pattern recognition, and data classification using unsupervised identification of complex data patterns.

2. Background of the Invention

Statistical classification (or "learning") methods attempt to segregate bodies of data into classes or categories based on objective parameters present in the data itself. Generally, classification methods may be either supervised or unsupervised. In supervised classification, training data containing examples of known categories are presented to a learning mechanism, which learns one more sets of relationships that define each of the known classes. New data may then be applied to the learning mechanism, which then classifies the new data using the learned relationships. Examples of supervised classification systems include linear regression, and certain types of artificial neural networks, such as back-propagation and learning vector quantization networks.

Because supervised learning relies on the identification of known classes in the training data, supervised learning is not useful in exploratory data analysis, such as database mining, where the classes of the data are to be discovered. Unsupervised learning is used in these instances to discover these classes and the parameters or relationships that characterize them.

Unsupervised classification attempts to learn the classification based on similarities between the data items themselves, and without external specification or reinforcement of the classes. Unsupervised learning includes methods such as cluster analysis or vector quantization. Cluster analysis attempts to divide the data into "clusters" or groups that ideally should have members that are very similar to each other, and very dissimilar to members of other clusters. Similarity is then measured using some distance metric which measures the distance between data items, and clusters together data items that are closer to each other. Well-known clustering techniques include MacQueen's K-means algorithm, and Kohonen's Self-Organizing Map algorithm.

One of the as of yet unattained goals of unsupervised learning has been a general learning method that could be applied in multiple stages to discover increasingly complex structures in the input. A specific case of this problem is that of identifying, or separating, highly nonlinear subspaces of data, perhaps surrounded by noise.

The unsupervised identification of nonlinear subspaces of data is an important problem in pattern recognition and data mining. Many data analysis problems reduce to this identification problem; examples include feature extraction, hierarchical cluster analysis and transformation-invariant identification of patterns. Although work in this field dates back to the 1930s, good solutions exist only for cases where the data occur in approximately linear subspaces, or in cases where the data points group into well-separated, disjoint classes. Instead, if the data points lie along very nonlinear subspaces and is clouded by noise, conventional unsupervised methods fail. In particular, such nonlinear subspaces are more likely in multidimensional real-world data.

Accordingly, it is desirable to provide a system and method of unsupervised learning that is particularly suited to identifying non-linear clusters of data in highly dimensional data, and thus suited for data exploration, such as database mining, or feature extraction, and similar applications.

SUMMARY OF THE INVENTION

The present invention overcomes the limitations of conventional unsupervised and supervised learning methods and systems by providing for unsupervised learning of non-linear subspaces in complex, high dimensional data. The present invention uses a hierarchical combination of clustering/vector quantization and data encoding based on proximity and connectedness of the data distribution. Vector quantization partitions the input data distribution into regions; data encoding expresses relationships between connected regions, and enables these relationships to influence further vector quantization until the number of connected regions in the data reaches a desired number.

The present invention accepts data that is organized as an unordered collection of vectors that is unlabeled with respect to some variable of interest, and outputs a clustering of such data into relatively disjoint clusters, even when there is considerable noise present in the data. The present invention constructs a hierarchical layering of clusters, with each layer successively building increasingly complex approximations to the data space. Each layer in the hierarchy takes its input from the previous layer (with the first receiving the data), learns a graph-based representation of its input, and re-encodes the input data using distance and proximity features of the graph into an encoded form, which is input into the next layer for processing. The repeated processing of the data results in the forming of increasingly larger (more data items) clusters which are not necessarily linear in the data space.

In a preferred implementation, the present invention uses three separate processes. First, a robust vector quantization process is used to distribute cluster centers throughout the input space. The vector quantization process provides a globally optimal distribution by positioning each cluster center as a function of the proximity of all of the data items being input, not merely those that are closest according to some distance metric.

Second, a topological graph construction process links up the cluster centers into a graph that approximates the topology of the input space. The graph models both the distribution of the cluster centers, and the density of the input vectors between the cluster centers.

Third, an encoding process encodes the input vectors using the topological graph, using path lengths along the graph and the rank-ordered distances from cluster centers to each input vector to generate an output code for each cluster. This encoded vector set is used as the input set on a subsequent pass through the data.

The present invention is particularly suited to large data mining operations in multidimensional real-world data. These include pattern recognition, data compression, and invariant feature extraction for representing natural data in symbolic form.

BRIEF DESCRIPTION OF THE DRAWINGS

FIGS. 7a–7d are illustrations of four clusters in a sixth layer of the hierarchy.

FIGS. 8a and 8b are illustrations of the two clusters at a top layer of the hierarchy.

DETAILED DESCRIPTION OF THE PREFERRED EMBODIMENT UNSUPERVISED IDENTIFICATION PROCESS

Figure 1:
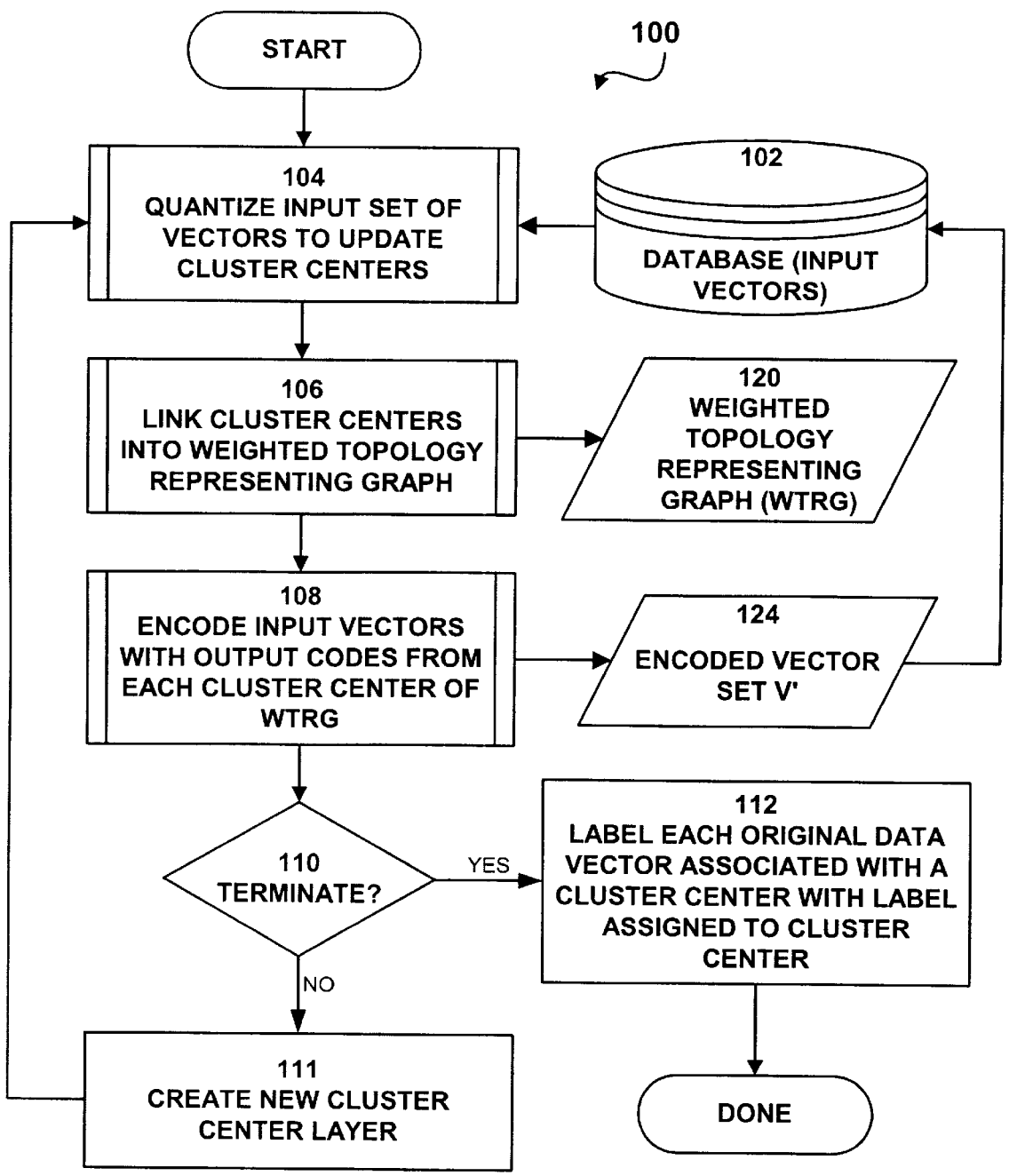
FIG. 1 is a flowchart illustrating the unsupervised identification process according to an embodiment of the present invention.

Referring now to FIG. 1, there is shown a flowchart of a process 100 for unsupervised identification of data classes in accordance with the present invention. The unsupervised identification process 100 executes on a computer programmed and configured with various software modules in accordance with the present invention, and as further described below.

The unsupervised identification process 100 operates on a collection of data stored in a database 102 or other data store. Generally, the data items are represented as vectors $\vec{V}_i$, i=0 . . . N−1 in a D dimensional space. D defines a number of data elements or portions of each data item, and each component of a vector corresponds to a portion of a data item that can be represented in some quantitative form. Non-quantitative data may be mapped to quantitative values. For example, if a data item includes a text string specifying a country, then the text string can be replaced with a number indicating an equivalent country code.

In one embodiment, the data collection is a collection of credit card transactions, each credit card transaction is represented by a vector, with vector components for the date, amount, standard industry codes, authorization codes, and any other quantitative measures of transactional behavior of the card holder. In another related embodiment, each data item is an account of a transacting entity, such as a credit card holder, merchant, point of sale device, or the like. A vector for such a data item includes current account balance, average rolling balances for past 30, 60, or 90 days, high balance amount, number and amount of late payments or overdrafts, and any other quantitative measures derived from raw transactions generated by the transacting entity. Raw transaction data may also be used. In a further embodiment, data items are medical insurance or worker compensation claims, with vector components for claim amount, injury type, medical procedure code for current treatment applied, prior treatment codes, hospital and doctor identifying codes, and so forth. In yet another embodiment for pattern recognition and image analysis, the data items are bitmapped images, and the vector components may include color histograms, texture parameters, luminance maps, and other derived data values.

While the vectors may contain certain labeling or classifying information (e.g. zip code, SIC code, etc.), they are unlabeled or unclassified with respect to some independent variable of interest. Continuing the above example of credit card or medical claim transactions, the variable of interest may be whether a transaction is fraudulent or non-fraudulent. The particular variable of interest may have known values (e.g. fraudulent/ non-fraudulent) or may have unknown values which are discovered by the unsupervised identification process.

With respect to a particular variable of interest, the data vectors are by their nature grouped into m relatively dense or cohesive clusters or data manifolds Mj, j=0 . . . m−1. These clusters may be highly nonlinear, perhaps wrapping or folding around each other throughout the D dimensional vector space. In addition, there may be background noise that lies between the manifolds so that strict boundaries do not exist between. However, it is assumed that the manifolds remain sufficiently distinct, and have few intersections, that is, there are relatively few, e.g., less than 5–10%, of the vectors that are common to multiple manifolds. The present invention solves the problem of identifying to which manifold or cluster each data vector belongs, and thereby providing a basis for appropriate labeling of the data vectors.

Figure 2:
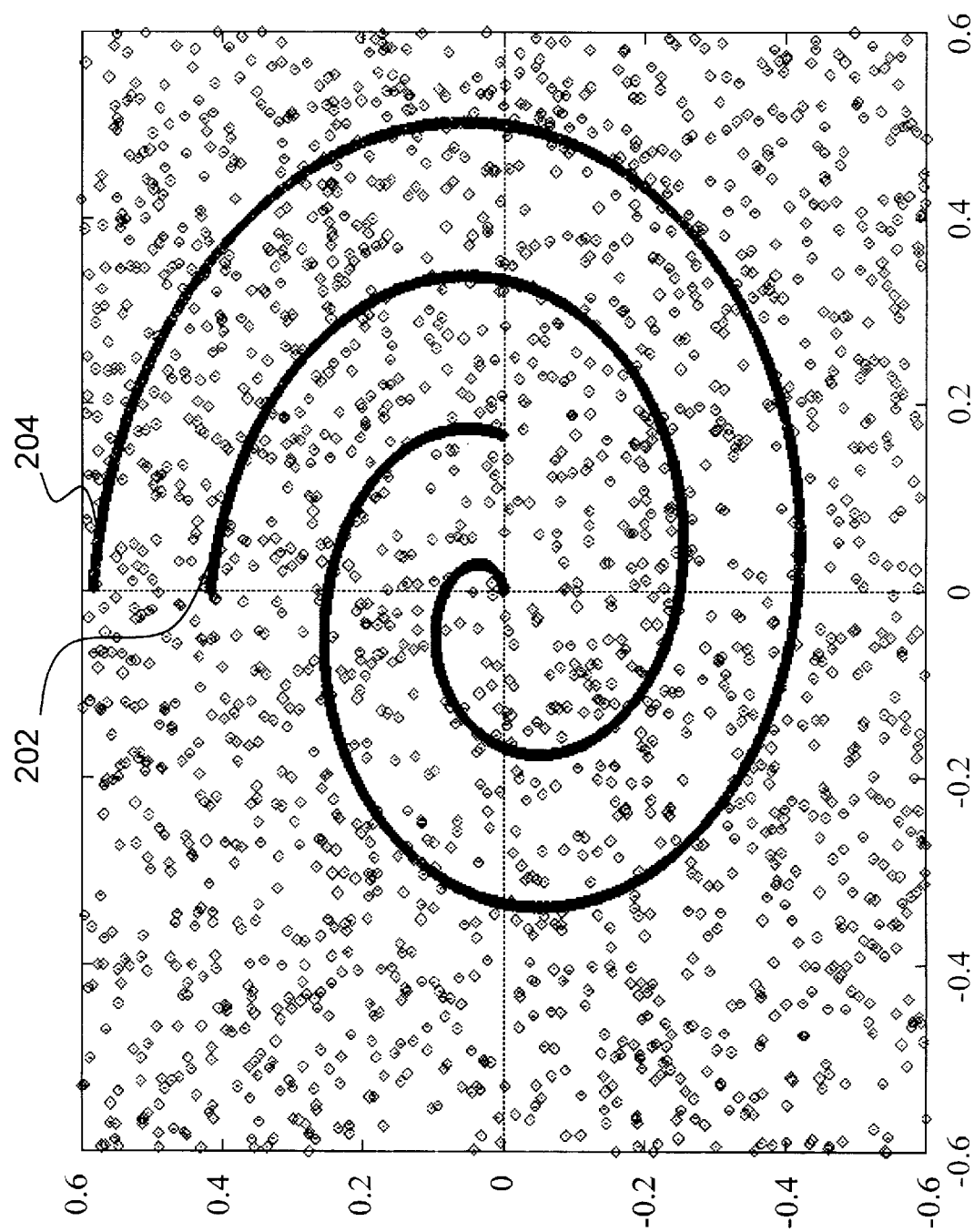
FIG. 2 is an illustration of the two spiral problem.

FIG. 2 illustrates a simple example of the classification problem solved by the present invention. In this illustrative example, the data items are 2-dimensional vectors densely distributed in two intertwined spiral distributions, and surrounded by uniformly random noise of low density. In the example of FIG. 2, there are 10,000 points, of which 3,976 are associated together to form the inner spiral 202, and 4,096 of which form the outer spiral 204. The remaining 1,958 are the uniform random noise. While the spiral distributions in FIG. 2 are visible to the human observer, it is important to note that the data vectors are received by a programmed computer without any labeling indicating to which spiral each data vector belongs, or whether it is part of the noise. Rather, the computer must discover which vectors are associated with which spiral and which with noise. The present invention solves this problem and without any such labeling separates the data vectors into the spirals (clusters) and noise (which may be its own cluster or distributed onto the spirals). Those of skill in the art will appreciate that the two spirals problem is often used as a test case for "supervised" learning algorithms, such as nonlinear regression and backpropagation networks. In these supervised training approaches, each data vector is labeled according to which spiral its belongs, and the regression algorithm or network, etc. attempts to classify the vectors using such labeling. The present invention however solves a significantly more difficult problem because such labels are not available to use for identification. Rather, the present invention creates the correct clusters without the prior labeling information used in supervised learning. Those of skill in the art will also appreciate that the illustration of the application of the present invention to two-dimensional data is merely for convenience and explanation; in actual use the present invention is particularly suited to high dimensional data, often with more than 100 or more variables, such as transaction data, image data, and the like.

The present invention provides a process that is applied repeatedly, in a hierarchy of stages, to extract increasingly larger scale clusters of vectors from the initial set of inputs vectors V. Generally, each stage, or layer in the hierarchy takes as it input a set of vectors from the previous layer, encodes a representation of the input vectors, and re-encodes the input vectors for processing by the next layer.

The present invention entails three processes operating at each layer. Referring to FIG. 1, first, a vector quantization process 104 is applied to the input vectors V to place a set of cluster centers optimally in the D dimensional vector space. Second, these cluster centers are linked 106 into a topological graph 120 of the input space using a graph construction method. During the graph construction, edges linking pairs of cluster centers are given weights that are inversely proportional to the number of vectors between them, so that the resulting weighted graph 120 represents both the topology of the input space and the local density of vectors between each of the cluster centers. Finally, using this graph 120, the input data is encoded 108 into a new vector set 124, which represents both the proximity of the input vectors to respective nearest cluster centers, and how well connected the graph is in the area of each input vector. In particular, the encoding process 108 creates an encoded vector for each input vector, with each cluster center in the current layer providing an output code as a vector component of the encoded vector. The output code for each cluster center is a function of both the topology of the graph and the connectedness of the input vector to graph. In a preferred embodiment, each cluster center provides a vector component as a function of the distance of the cluster center to the input vector and a shortest path through the graph from the cluster center to the closest cluster center to the input vector.

The set of encoded vectors 124 is then presented as the input vectors to the next layer, which repeats the same set of processes. In the next layer the number of cluster centers is preferably reduced 111, thereby creating fewer, larger clusters of vectors in each layer, each cluster having a particular cluster center. After each layer is processed, each of the input vectors is associated with the closest one of the cluster centers defined at the layer, thereby providing a classification of the input vectors in each layer.

At some point a termination condition is satisfied 110. Termination may be based on a threshold minimum number of cluster centers, or a threshold minimum degree of orthogonality in the encoded vectors. Once terminated, each of the clusters from the last layer represents a classification or manifold of associated vectors. Thus, all input vectors that are associated with a given cluster center are labeled 112 with a label defined for that cluster center. For example, if there are three cluster centers following termination 110, then each cluster center may be trivially labeled "1," and "2," "3" this labeling applied to each vector associated with the respective cluster center. The numeric labeling may be mapped to textual categories specific to the implementation. For example, in the embodiment where data items are transactions, the labeling may be encoded such as "1" is "very high likelihood of fraud", "2" is "low likelihood of fraud" and "3" is "not fraudulent".

Vector Quantization

The present invention is useful for identifying clusters of data in real-world data mining applications. For example, in credit card or medical claim analysis, a typical data item such as a credit card account or medical claim account may be represented by 200 to 400 different variables, most of which are derived from transactional data. In such applications there tends to be complex nonlinear clusters of data.

For highly nonlinear clusters, it is preferred to use a robust, globally-optimal vector quantization algorithm. Traditional algorithms such as K-Means are inadequate because of their high degree of sensitivity to initial conditions and because of slow convergence properties. Although several better variants have been proposed (e.g. Linde, et. al 1980, Jain 1988, Ng and Han 1994, Ester et. al 1996), most have a significant heuristic component, and often do not work well in high-dimensional spaces.

In our preferred embodiment, the vector quantization process is a batched extension of the Neural Gas algorithm of Martinez et al. 1993. Neural Gas provably optimizes the same mean-squared distance cost function as the K-means algorithm, while achieving near-globally optimal solutions. However, Neural Gas is not designed to work efficiently in high-dimensional data intensive environments. The batched extension, here termed Batch Neural Gas (BaNG), can converge in O(log K) passes through the data, increases robustness in high-dimensional spaces, and eliminates learning parameters, making it simpler to implement and use in practice than the original Neural Gas algorithm.

The Batch Neural Gas algorithm is best understood as a generalization of K-means. To clarify the similarities and differences, is it helpful to summarize K-means. Essentially, K-Means determines for each vector which cluster center it is closest to, and then updates each cluster center to the mean of the vectors for which that cluster center is the closest. Thus, K-means only uses a portion of the vectors to update the cluster centers, ignoring the influence of any vector which is closer to another cluster center.

Batch Neural Gas takes into account the location of all input vectors when updating the cluster centers. In an epoch of the BaNG algorithm, each cluster center is updated using all the input vectors, unlike K-Means which uses only the closest. For a given cluster center, this is accomplished as follows: For each data point $\vec{V}_i$, the cluster centers are ranked according to their distance from $V_i$. The contribution of $\vec{V}_i$ to the location of a cluster center is defined as a function of the rank of the cluster center and a decay parameter. Preferably the contribution is $\vec{V}_i e^{-r_{ik}/\lambda}$ where $r_{ik}$ $\in [0 \ldots K-1]$ and is the distance rank of the cluster center k to vector $\vec{V}_i$ and $\lambda$ is the decay parameter. The term $$\vec{V}_i e^{-r_{ik}/\lambda}$$

is called the co-efficient of vector $\vec{V}_i$. After each pass through the data determining the contributions of the data vectors $\vec{V}_i$ to each of the cluster centers, a particular cluster center is normalized to the mean of the contributions of all of the input vectors $\vec{V}_i$.

A preferred implementation of a vector quantization process 104 using the BaNG algorithm is as follows:

1. Randomly select a set of K data vectors $\vec{V}_i$ as the initial cluster centers $C_k$. The number K will depend on the current iteration of the overall hierarchical process.

2. Allocate an array of K vectors $\vec{S}$ to hold partial contributions for the cluster center updates; initialize this array to zero. Thus, each vector $\vec{S}_k$ will store the summed partial contributions of all of the vectors to cluster center $C_k$.

3. Allocate an array of K scalar values T to hold the total co-efficient contributions of each vector to each cluster center; initialize this array to zero. Thus, each element $T_k$ stores the total co-efficient contributions of all vectors to the cluster center $C_k$.

4. Initialize the decay parameter $\lambda$ to K, the number of cluster centers in the current level of the hierarchy 5. Now loop through all of the data vectors V. For each data vector $\vec{V}_i$, do the following:

5.1. Determine the distance from $\vec{V}_i$ to each to cluster center $C_k$.

5.2. Sort the distances in ascending order, and assign each cluster center $C_k$ a rank $r_{ik}$ from 0 ... K−1. This operation rank orders the cluster centers from closest to farthest for the current vector $\vec{V}_i$.

5.3. Associate the current vector $\vec{V}_i$ with the nearest cluster center, that is, the cluster center with r=0.

5.4. For each of the K partial sum vectors $\vec{S}_k$, update the partial sum vector follows:

$$\vec{S}_k \leftarrow \vec{S}_k + \vec{V}_i e^{-r_{ik}/\lambda} \quad (1)$$

where $r_{ik}$ is the distance rank of the k-th cluster center $C_k$ to vector $\vec{V}_i$.

5.5. For each of the K cluster centers $C_k$, update the total co-efficient contributions using the contribution of $\vec{V}_i$:

$$T_k = T_k + e^{-r_{ik}/\lambda} \quad (2)$$

6. Update each cluster center $C_k$ to the mean of the partial sums:

$$\vec{C}_k = \frac{\vec{S}_k}{T_k} \quad (3)$$

This operation normalizes the location of the cluster center in the vector space, but accounts for the influence or contribution of all of the input vectors V, and not merely those that are closest to the cluster center, as in K-means. This ensures that the cluster centers are globally optimized, rather than merely locally optimized.

7. Determine if $\lambda >= \epsilon$, where $\epsilon$ is decay threshold, preferably 0.1 to 0.5. If so, then terminate. Otherwise, divide $\lambda$ by two, reset T and S to zero, and go to step 5.

To understand how the BaNG algorithm works, it is helpful to examine what cluster centers are produced when $\lambda$ is infinitely large or infinitesimally small. When $\lambda \rightarrow \infty$, all vectors contribute equally to updating all the cluster centers $C_k$, and all of the cluster centers end up at the mean of the data, $\Sigma_i \vec{V}_i / N$. However, when $\lambda \rightarrow 0$, each cluster center $C_k$ is updated to the mean of all the vectors to which it is closest. Therefore, when $\lambda$ is zero, the BaNG algorithm reduces to the K-means algorithm.

Accordingly, the decay parameter $\lambda$ provides a mechanism to gradually guide the vector quantization process 104 to a globally optimal solution. Initially, $\lambda$ is chosen to be large, say K. This choice brings all the cluster centers $C_k$ close to the center of the data distribution. In each subsequent epoch $\lambda$ is decreased until it reduces to zero (or a small stopping value). As $\lambda$ decreases, the cluster centers gradually spread out from the center of the distribution to their optimal locations. Empirical results show that $\lambda$ can be decreased exponentially without sacrificing the accuracy of clustering. Therefore in the preferred embodiment $\lambda$ is halved (at step 7) after each epoch until becomes a small value, say 0.1. This choice guarantees termination of the vector quantization process in O(log K) epochs. Experiments show that for a wide variety of data, O(log K) epochs are sufficient to yield a good solution. As a result of this fast convergence property, the BaNG algorithm performs vector quantization much faster than Kohonen maps, Maximum Entropy clustering and K-means clustering. Also, unlike in Maximum Entropy Clustering, the updates to cluster centers are calculated from a rank-ordering of distances, and not actual Euclidean distances themselves. This rank-ordering based update enhances the robustness of the vector quantization process, especially in high-dimensional spaces. The batching method decreases susceptability to getting stuck in local minima, and eliminates the approximate, stochastic online update of the original Neural Gas algorithm.

Figure 3:
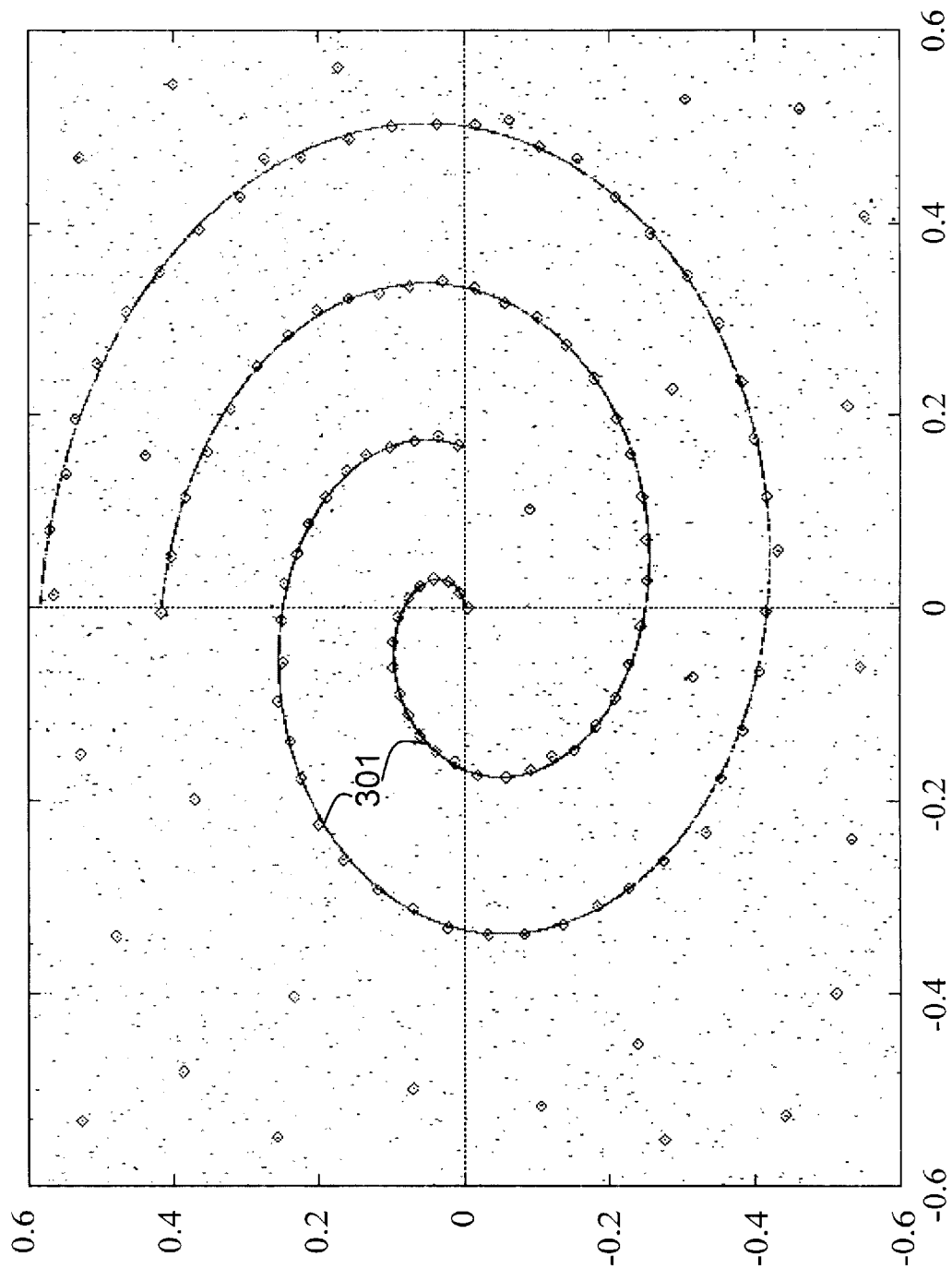
FIG. 3 is an illustration of the result of vector quantization of the two spirals data set.

FIG. 3 shows the result of vector quantization process of the two-spirals data set. The vector quantization process 104 positions the cluster centers 301 mostly in the two spirals, with the remaining few cluster centers 302 distributed in the noise. All of the cluster centers 301, 302 can now be linked up into a graph 120 that maps the shape of the data distribution.

Weighted Topology Representing Graph

The weighted topology representing graph ("WTRG") process 106 builds a graph of the cluster centers by linking pairs of cluster centers with edges. Each edge includes a weight to each edge that corresponds to the density of vectors between cluster centers linked by the edge. This weighted graph is later used in the encoding process to create the next set of input vectors in the hierarchical process.

Generally, the objective of constructing a weighted topology representing graph 120 is to obtain a data structure which has the property that if two vectors $\vec{V}_i$ and $\vec{V}_j$ are adjacent in the data space, they map to adjacent nodes in the graph 120 and vice versa. Such a data structure is then a coarse reflection of the shape of the data space, and the mapping between the graph 120 and the data space is fully invertible.

A simple algorithm for creating a topology representing graph includes taking each vector $\vec{V}_i$, and adding an edge between the two cluster centers $C_i$ and $C_j$ closest to it, if such an edge does not already exist. In problems where there are no noise points or intersections between clusters, such a simple topology representing graph based only on nearest neighbor cluster centers is sufficient for separating nonlinear clusters of data. However, if there is even the slightest amount of noise between the clusters, they will get connected up by spurious edges, and this simple algorithm will fail. To separate edges that are induced by noise from those induced by the data, the present invention keeps track of the vector density associated with each edge. For purposes that will become clear soon, a preferred embodiment weights each edge of the graph by the inverse of the vector density.

A preferred implementation of a method for constructing a weighted topology representing graph is as follows:

1. Loop over all vectors V. For each data vector $V_i$:
2. Find two closest cluster centers $C_i$ and $C_j$.
3. Test whether there is an existing edge between $C_i$ and $C_j$ 3.1. If so, increment a density count $d_{ij}$ of edge. Continue at 1.

3.2. If not, create an edge between $C_i$ and $C_j$ and set the density count to 1. Continue at 1.

4. For each edge between two cluster centers $C_i$ and $C_j$, set a weight $W_{ij}$ of edge: $W_{ij}=1/d_{ij}$.
5. Normalize weights W. Divide each edge weight $W_{ij}$ by average weight $\overline{W}$.

In the normalized graph, an edge that has average point density has a weight of 1.0, edges with higher densities have lower weights, and those with lower densities have higher weights.

Figure 10:
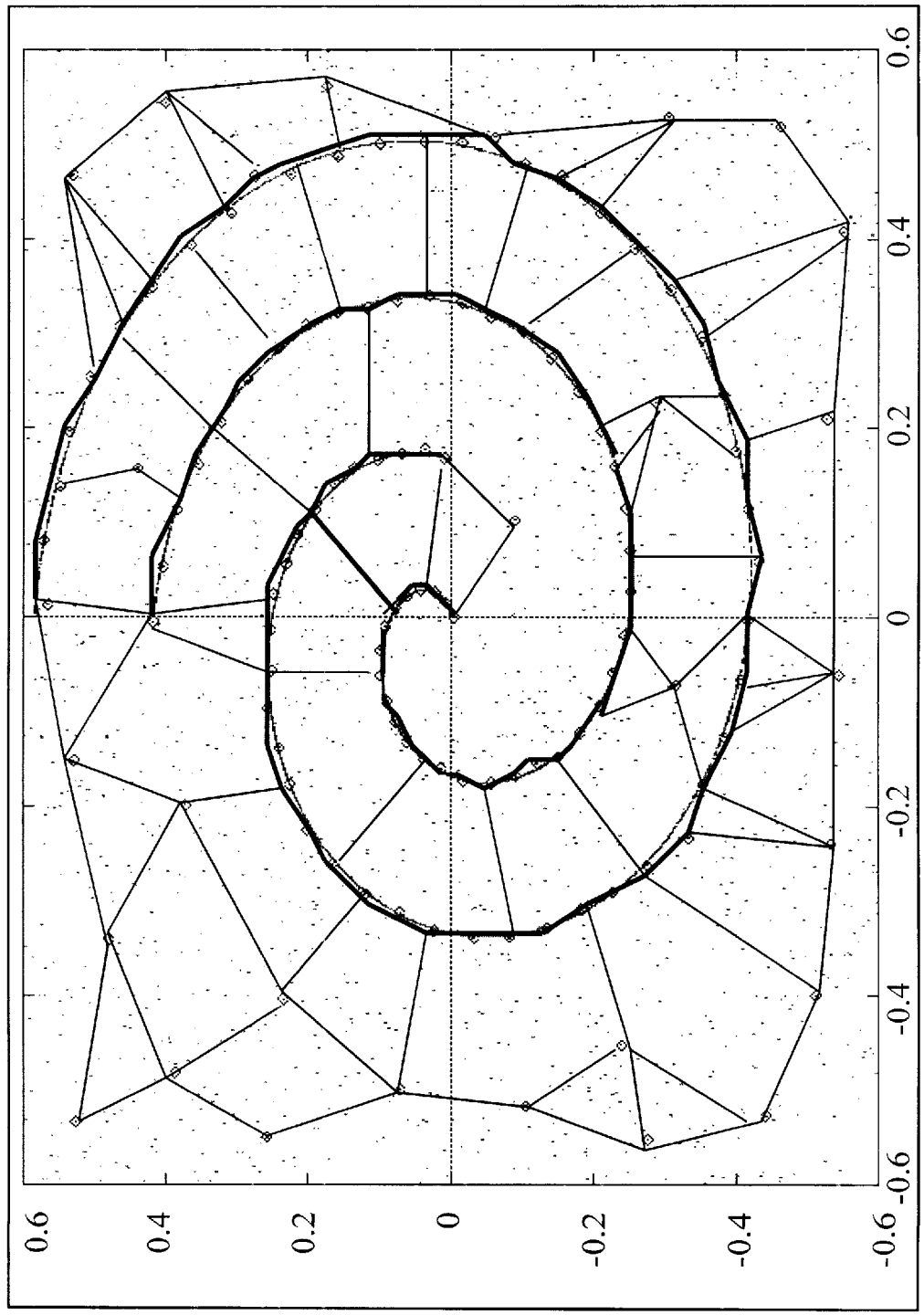
FIG. 10 is an illustration of a weighted topology representing graph.

FIG. 10 illustrates a weighted topology representing graph 120 for a set of cluster centers and vectors. The weight of each edge is represented by its line thickness, with high density/low weight edges being the thick lines, and low density/high weight edges being the thin lines.

Between any two cluster centers in a normalized graph, a shortest path may be computed, using the weights as a proxy for edge length, rather than the actual Euclidean distance between the cluster centers. The length of the shortest path through the graph between any two cluster centers then is a measure of how well the cluster centers are connected through regions of high density: the shorter the path, the more tightly connected they are and vice versa. This observation forms the basis for the next step in the overall process to identify nonlinear data clusters, viz., encoding of the input vectors to represent neighborhood relationships in the graph 120. During this process 108, because the high density edges have the lowest weights, the shortest paths will pass through the high density regions. The encoded input can then be processed by the next level of the hierarchy to extract larger scale clusters of data.

Encoding Process

The key objective of encoding 108 the input vectors V is to make it possible for the next layer to identify neighborhood relationships defined within the data space by the current set of clusters. The encoding process 108 preferably balances the proximity of an input vector in the input space to the cluster centers and continuity along the manifold. The output of the encoding process 108 is a set 124 of encoded vectors V'.

In a preferred embodiment, for each input vector $\vec{V}_i$, each cluster center produces an output code that represents both its distance from the input vector and how strongly it is connected to the weighted topology representing graph 120. To make the coding robust and scale-free, the distance-rank of the cluster center is used. Also, as a measure of connectedness, the length of the shortest-path, in the graph, of the current center to the closest cluster center to the input vector is used.

One preferred embodiment of the encoding process 108 is as follows:

1. Compute All Pairs Shortest Paths between each pair of cluster centers $C_i$ and $C_j$ in graph, using edge weight as the length of each edge. Floyd's algorithm may be used to determine the shortest paths.
2. Loop over the input vectors V. For each data vector $V_i$:
   2.1. Find the Euclidean distance of vector $V_i$ to each cluster center $C_k$.
   2.2. Sort the distances in ascending order and assign each cluster center $C_k$ a rank $r_k$ from 0 ... K−1. Let q be the index of closest cluster center, i.e. cluster center $C_q$ has rank $r_q=0$.
   2.3. For each cluster center $C_k$, determine an output code $O_k$:

$$O_k = e^{-(r_k + \alpha \cdot p_{kq})/\tau} \quad (4)$$

The output codes are floating point values from 0.0 to 1.0. Note that the output codes that now characterize the input vectors are wholly distinct from the originally data, but rather represent abstractly the relationship of the example codes input vector to the distribution and continuity of clusters in the original data.

Through the parameter α the encoding process 108 gives the user a way to emphasize continuity on the manifold relative to Euclidean proximity. A balanced weighting works well for most practical applications, and a value of 1.0 is a good enough choice. The effect of the parameter τ may be understood in the same fashion as for the parameter λ in the vector quantization process 102. When τ tends to infinity, all cluster centers will produce the same output, and the distinctions between cluster centers will fade. When τ tends to zero, only the closest cluster center (rank r=0), will produce an output, and the neighborhood relationships to other cluster centers will not be visible in the output code. Thus, τ controls the range over which continuity in the input space is expressed. In practice, values in the range of 3 to 8 work well, with the lower end of the range being preferred in high-noise situations.

The K dimensional output vectors V' produced by the encoding process 108 are collected into a data set 124 and used as the input vectors for the next layer in the hierarchy. Each encoded vector $\vec{V}_i'$ is an encoding of its original data vector $\vec{V}_i$. Each subsequent layer has fewer, usually half, the number of cluster centers as the previous layer, and thus, the size of the output vectors V' is reduced with each layer of the hierarchy, providing a form of lossy compression of the original data. In this way, a pyramidal structure is built up: the entire process 100 starts with a fairly large number of cluster centers in the first layer to get a good resolution of the data, and successively halves the size of the layers going up the hierarchy. The choice of how many layers to use is defined a termination condition, as described above. Termination conditions may be based on a predetermined number of data clusters to identify, or by statistical analyses designed by the analyst and applied at each layer of the hierarchy. Once the termination condition has been satisfied, there will be a number of clusters of vectors, each cluster defined by a cluster center. The vectors associated with a cluster are those for which cluster center provides the most significant output code during the encoding process 108. Each of the original input vectors can then be labeled 112 using a label assigned to the cluster center that the vector is associated with. The labels may initially be simple coding, e.g., "cluster 1," "cluster 2," and so forth, simply for the purpose of initial classification. More meaningful label may be applied if known, such as "fraudulent" or "non-fraudulent" when clustering transactions. However, in some embodiments it is expected that an analyst will further investigate the clusters, for example using other statistical measures, to obtain an understanding of the relatedness of the cluster vectors, and select more meaningful classification labels.

Figure 4A:
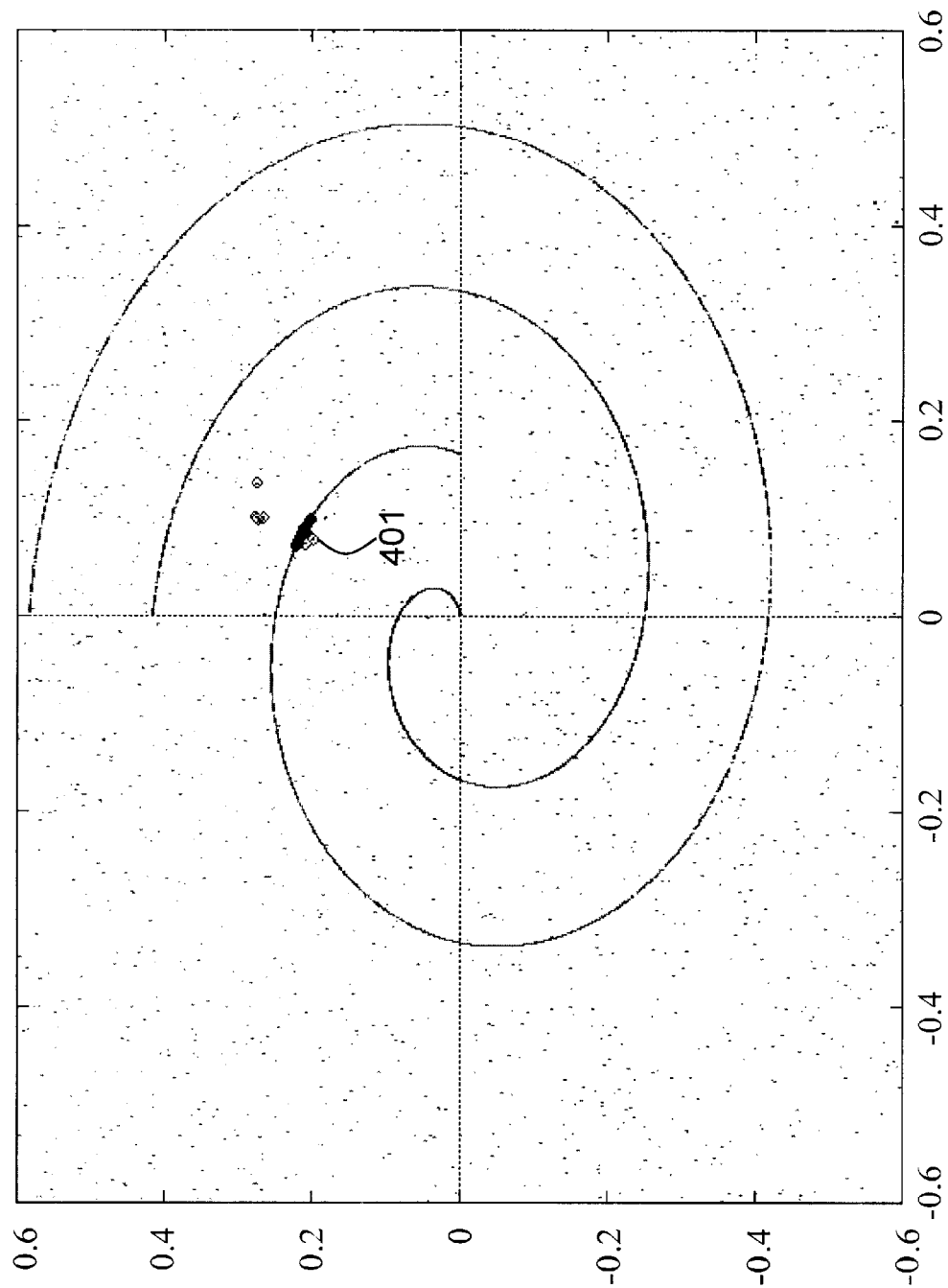
FIGS. 4a and 4b are illustrations of clusters in a first layer of the hierarchy, after a first epoch of the unsupervised identification process.
Figure 4B:
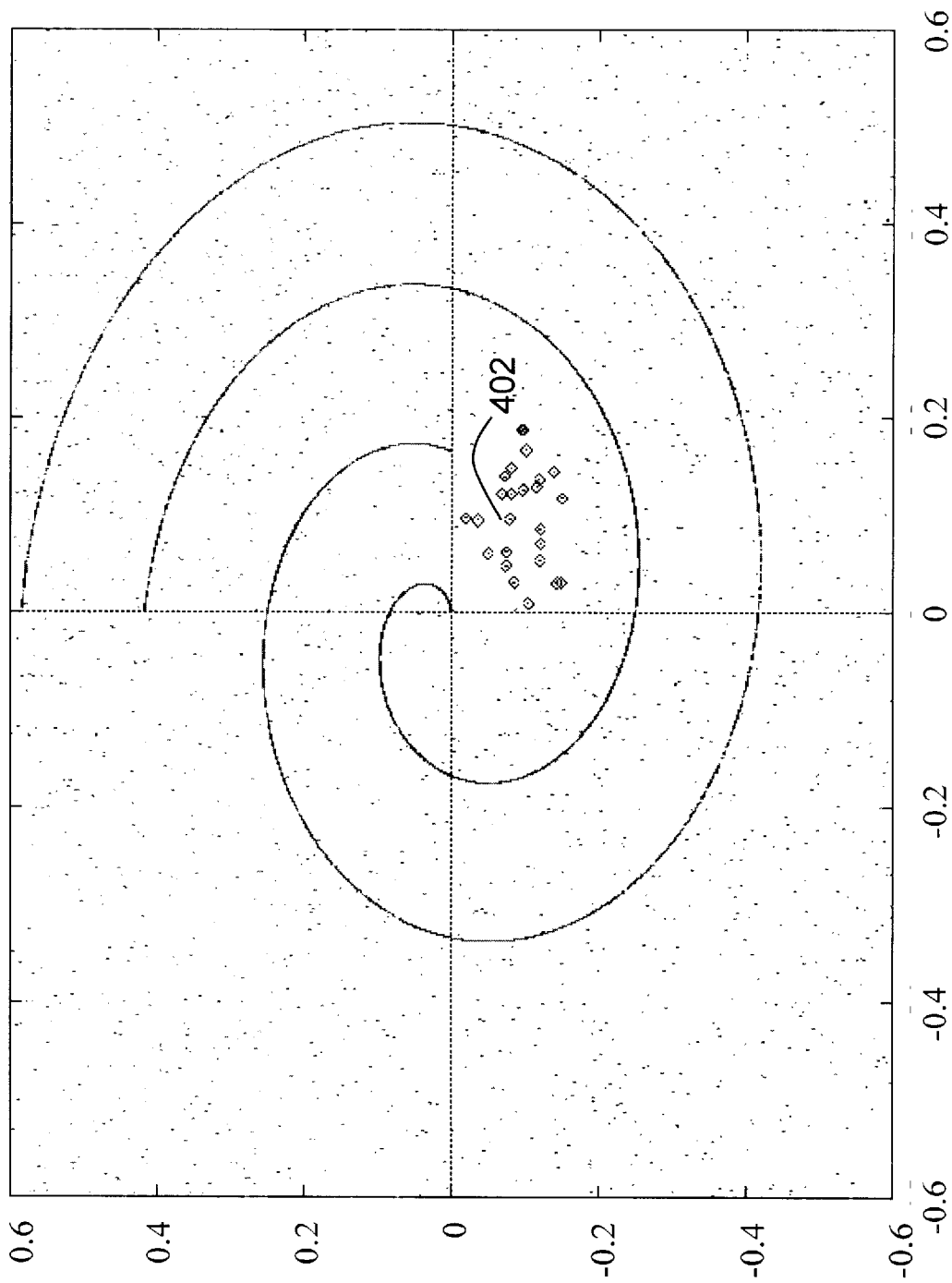

To further explain how the present invention provides for unsupervised identification, it is helpful to examine how the identification process 100 clusters the data for the two-spirals problem. During the first layer, the vector quantization process 104 distributes the first layer cluster centers 200 in the data set as shown in FIG. 2, following the initial spiral structures in the input space. In this first layer, there are 128 clusters centers. Referring to FIGS. 4a and 4b, there are shown plots of the vectors that are closest to two of the cluster centers. Cluster center 401 is one of the spirals. Cluster center 402 is in the noise.

In the WTRG process 106, all of the cluster centers are linked into a weighted topology representing graph. Because of the higher density of points in the spiral manifold, the WTRG process 106 creates strong edges between cluster centers on the spirals. The edges between cluster centers on the spirals and those in the noise will be of low point density and therefore weak. Because the topology representing graph process 106 assigns weights according to the inverse point density, weighted paths between cluster centers on the spirals will be short, and the paths to noise centers will be long. Therefore, according to Eq. (4), strongly-connected cluster centers will produce similar output code values.

To understand the encoding process 108 better, consider the case when an input vector is located close to a spiral. The closest cluster center $C_q$ to the input vector will produce an output of 1.0, because both the rank $r_k$ and the path length to itself $p_{qq}$ in Eq. (4) are zero. The next highest output will be produced by a cluster center that is strongly connected to this closest cluster center and has the lowest sum $(r_k+p_{kq})$. The chances are that it will be another cluster center that also lies on the spiral. Essentially, the cluster centers that have paths of high-density vectors between them will frequently produce strongly correlated output codes.

Figure 5A:
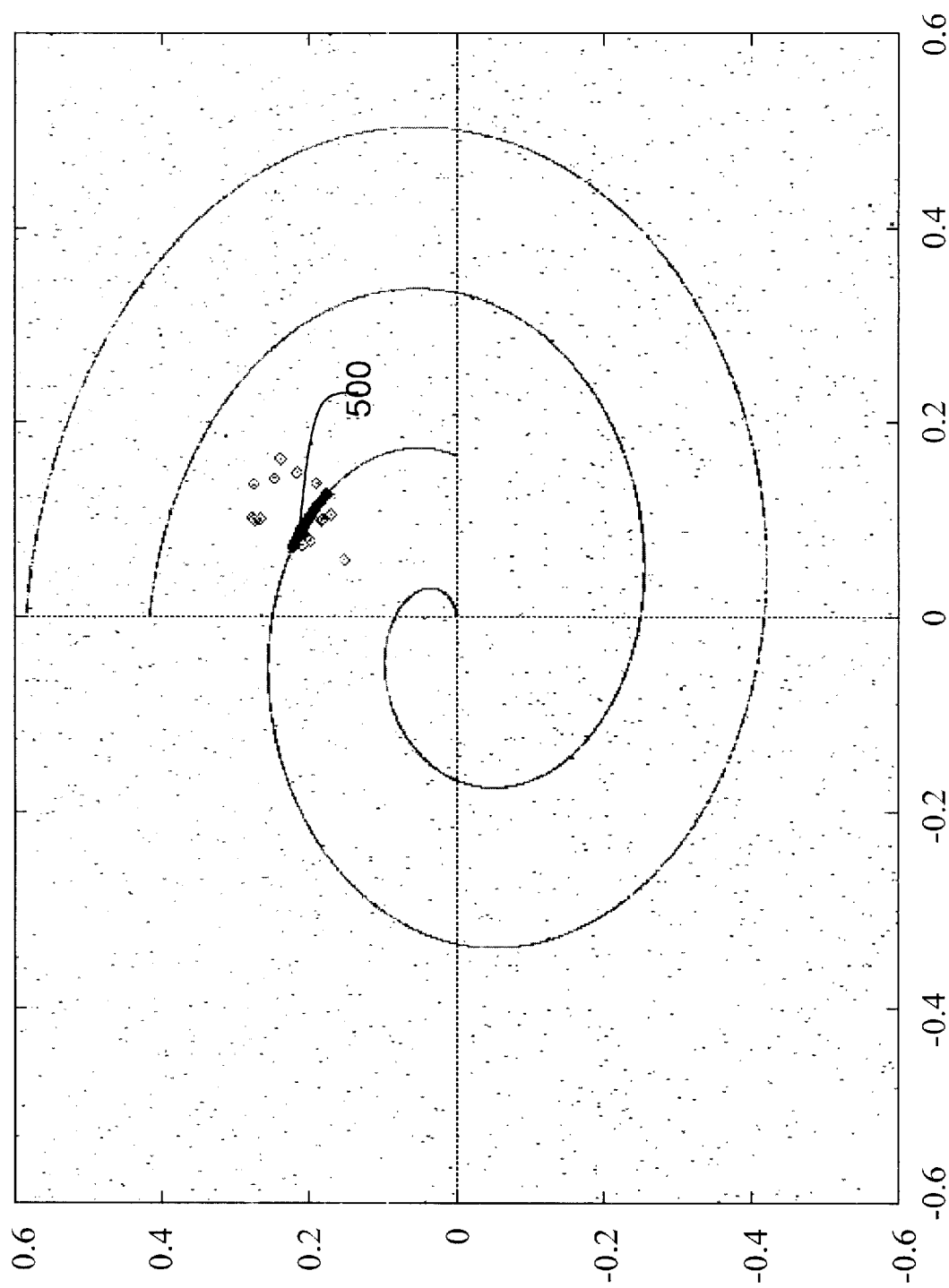
FIGS. 5a and 5b are illustrations of clusters in a second layer of the hierarchy, after a second epoch of the unsupervised identification process.
Figure 5B:
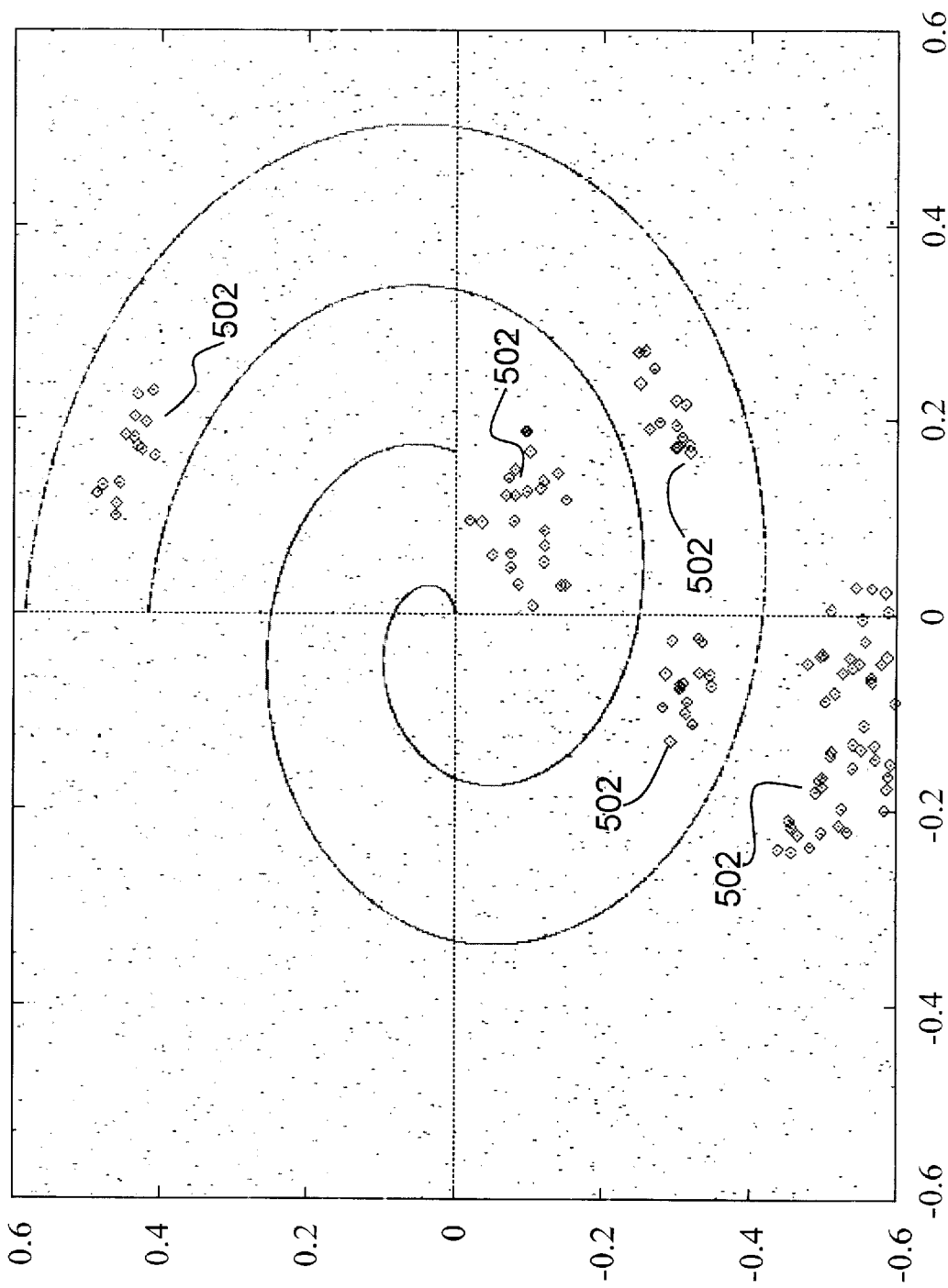

When the second layer of the hierarchy is trained using the encoded vector set 124 as the input vector set, the vector quantization process 104 will group the closest input vectors into the same cluster. The effect of this is to group the highly-correlated, or strongly-connected cluster centers of the previous layer into a single new cluster in the next layer. Because the next layer has half as many cluster centers as the previous, an average of two centers from the previous layer will be linked up. The input vectors that map on to these second layer cluster centers will then cover a larger part of the manifold. FIGS. 5a and 5b illustrate this effect. Both of these figures are for a second layer of the hierarchy which has 64 clusters, and show two typical clusters. FIG. 5a shows the cluster 500 in this layer that includes input vectors highlighted in FIG. 4a, and FIG. 5b shows the cluster 502 that includes the input vectors highlighted in FIG. 4b. Note that in both cases, the clusters 500, 502 are more elongated, indicating that larger scale structures in the data space are gradually being formed. FIG. 5b also illustrates that input vectors in the noise tend are included in the same cluster 500 with other noise vectors, instead of with other input vectors that are closer but associated with a cluster on a spiral.

Figure 6A:
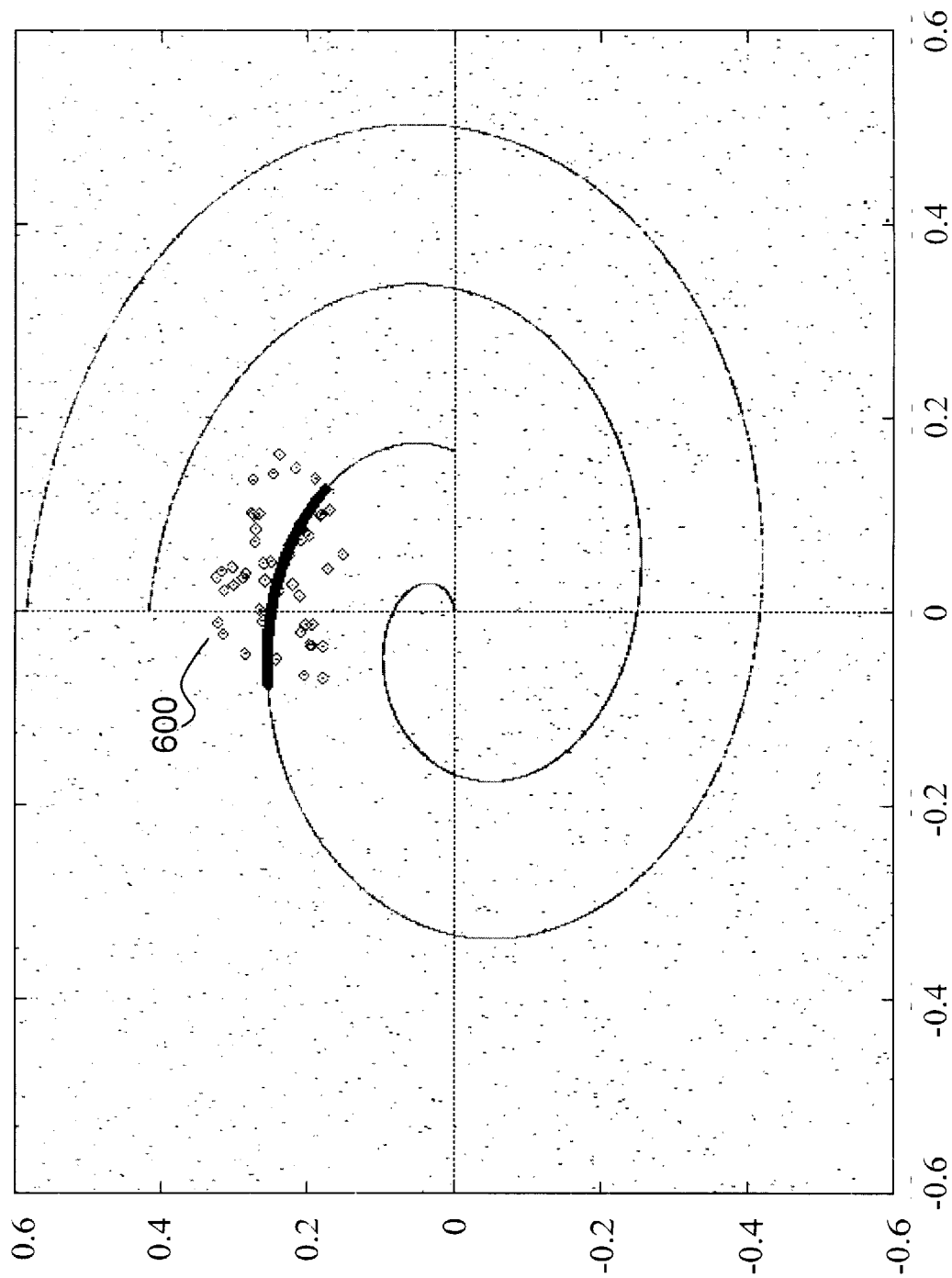
FIGS. 6a and 6b are illustrations of the cluster in a fourth layer of the hierarchy, after a third epoch.
Figure 6B:
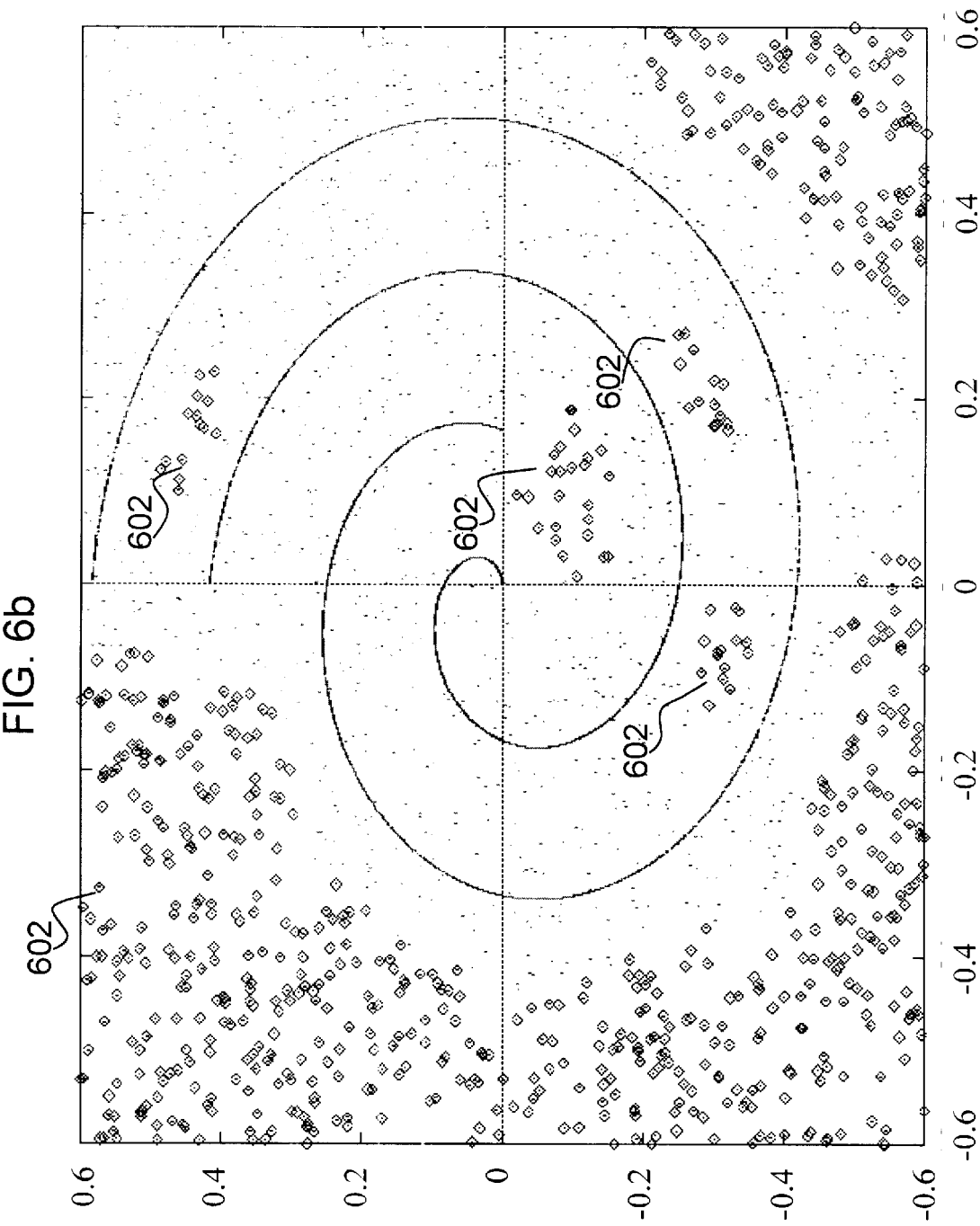
Figure 7B:
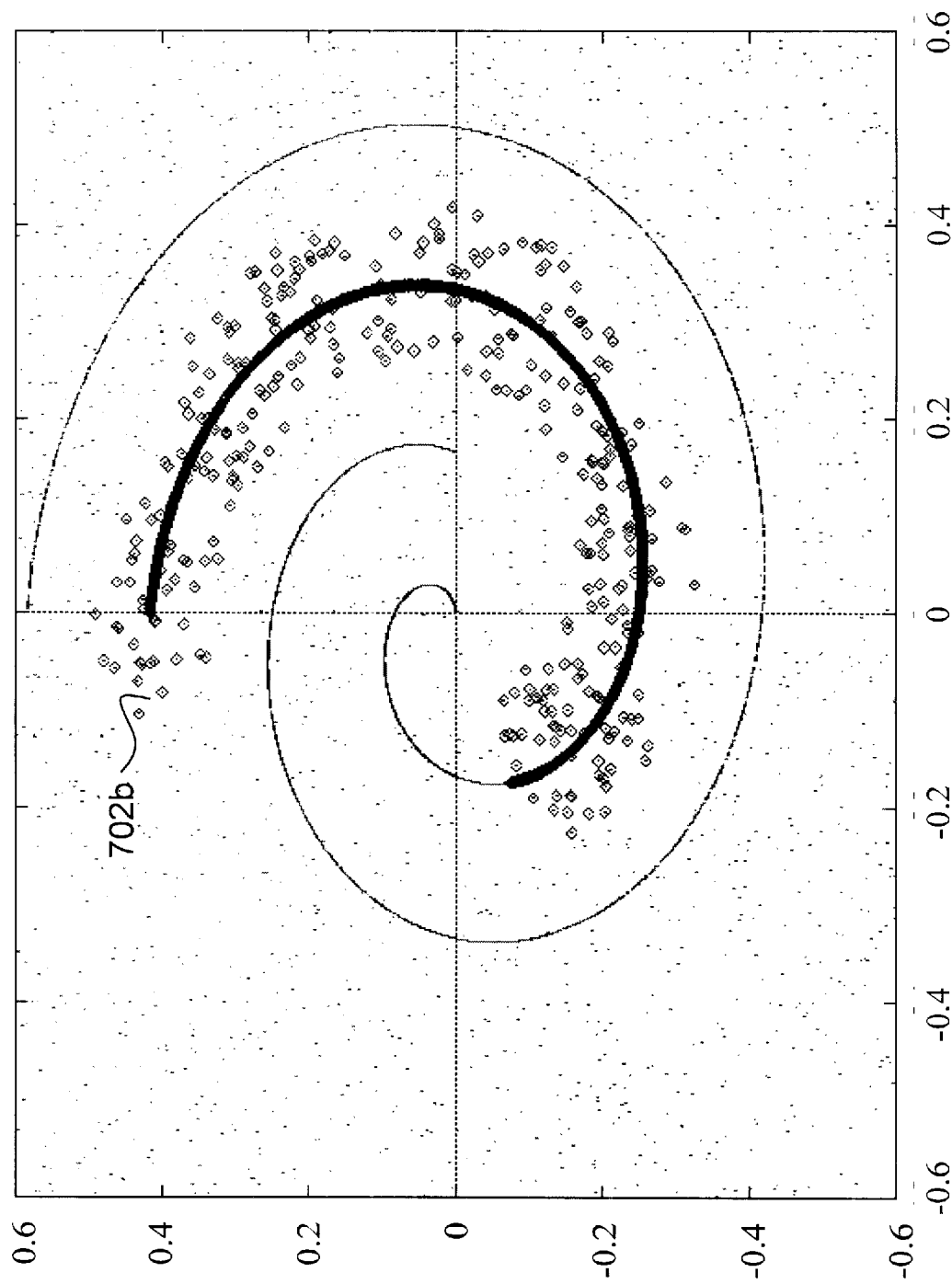
Figure 7C:
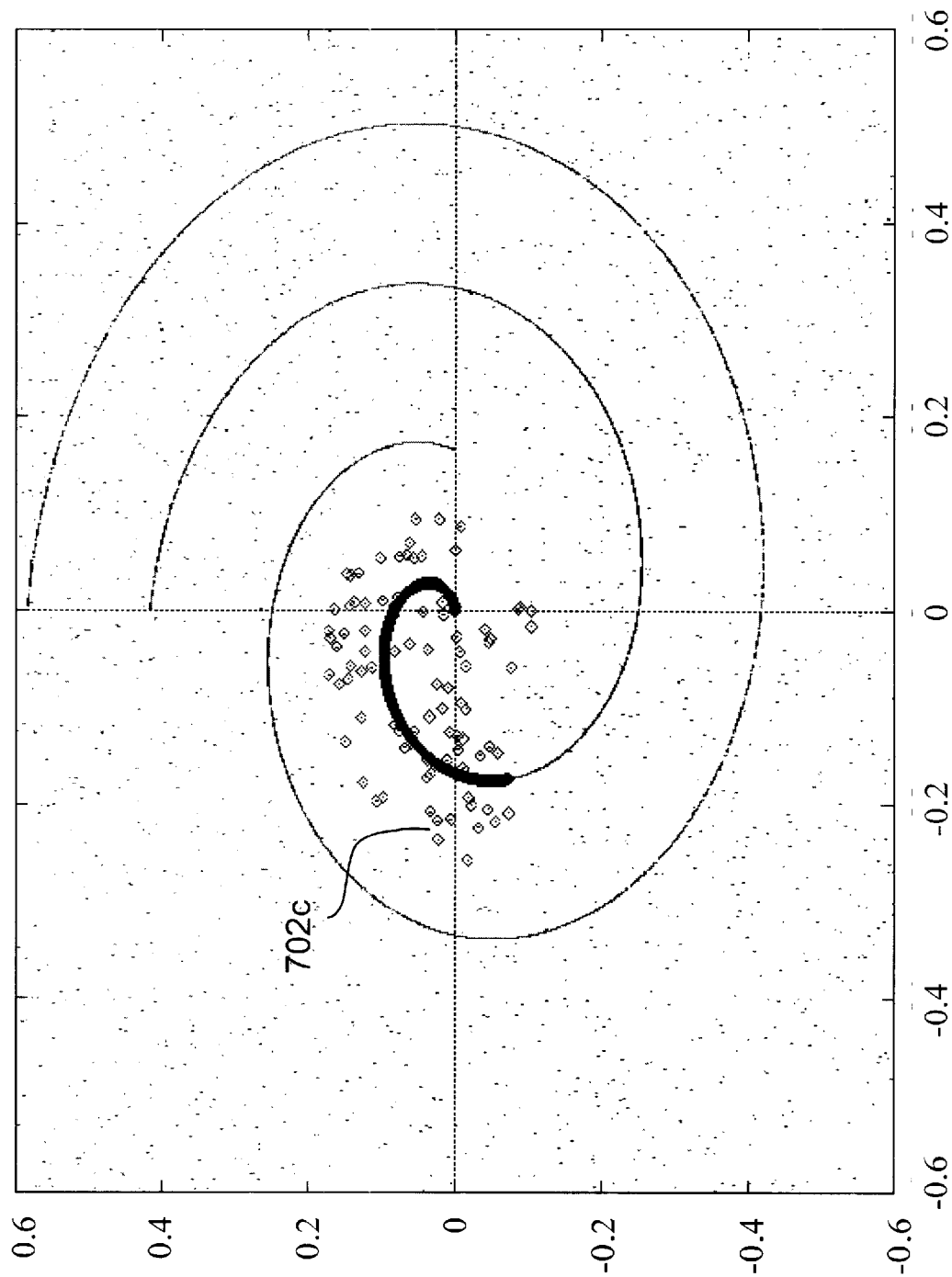
Figure 7D:
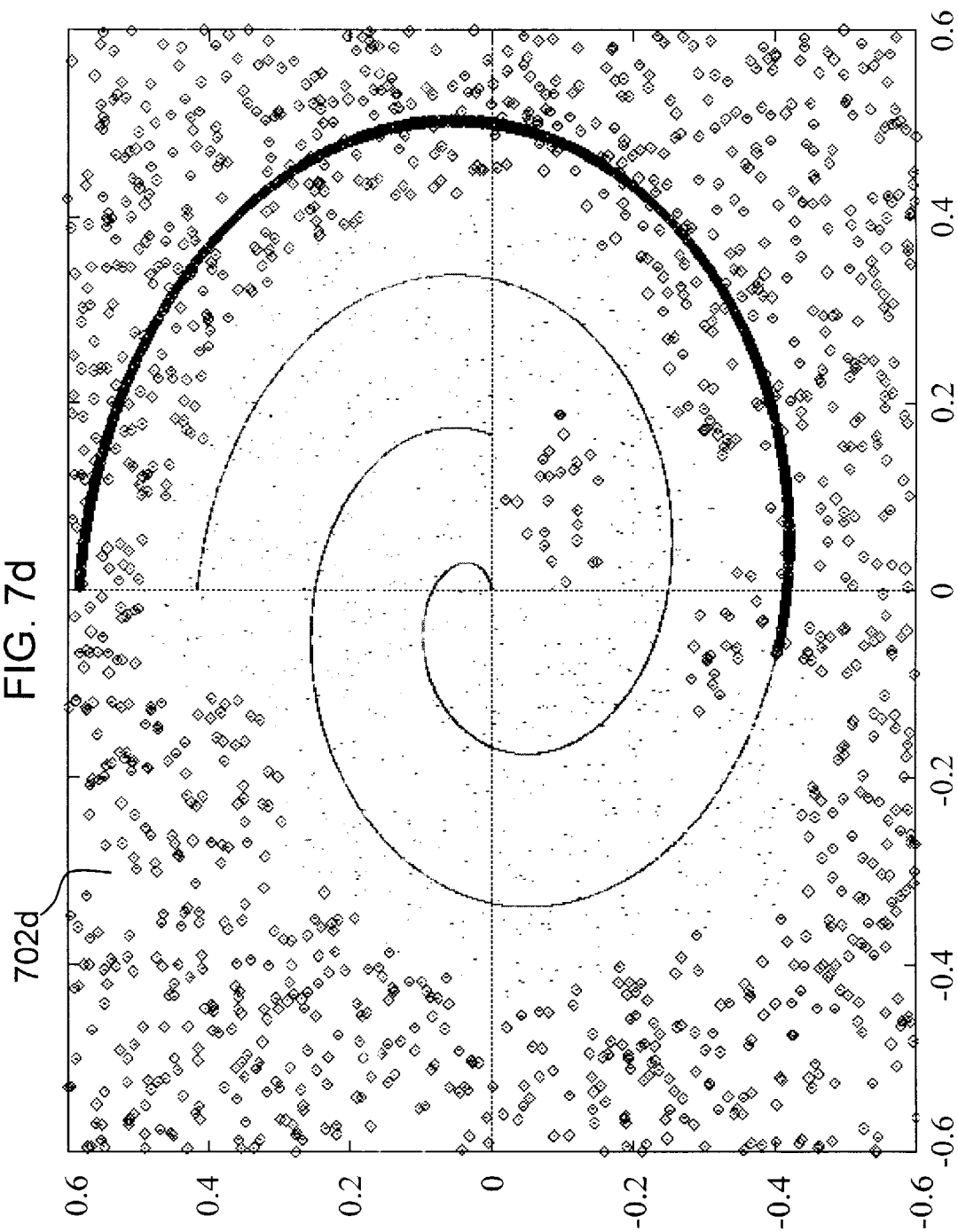

As each epoch of identification process 100 is executed, each layer of the hierarchy has half the number of cluster centers as previous layer. FIGS. 6a and 6b shows the clustering produced in fourth layer, after four epochs of the unsupervised identification process 100. In this layer there are 16 cluster centers. FIG. 6a shows the cluster 600 including the vectors in the cluster 500 of FIG. 5a, and FIG. 6b shows the cluster 602 including the vectors in the cluster 502 of FIG. 5b. Note that much of the total noise has been picked up by one cluster 602, while the other cluster 600 more precisely associates with vectors on the spiral.

As additional epochs of processing are executed, the noise vectors finally begin to be linked up into a single cluster. FIGS. 7a–7d illustrate the results of a sixth epoch, in which there are now only four cluster centers, partitioning the data space into four clusters 702. Note here that three clusters 702a, 702b, and 702c contain vectors on the spirals, and cluster 702d contains vectors from both the outer spiral and the noise.

Figure 8B:
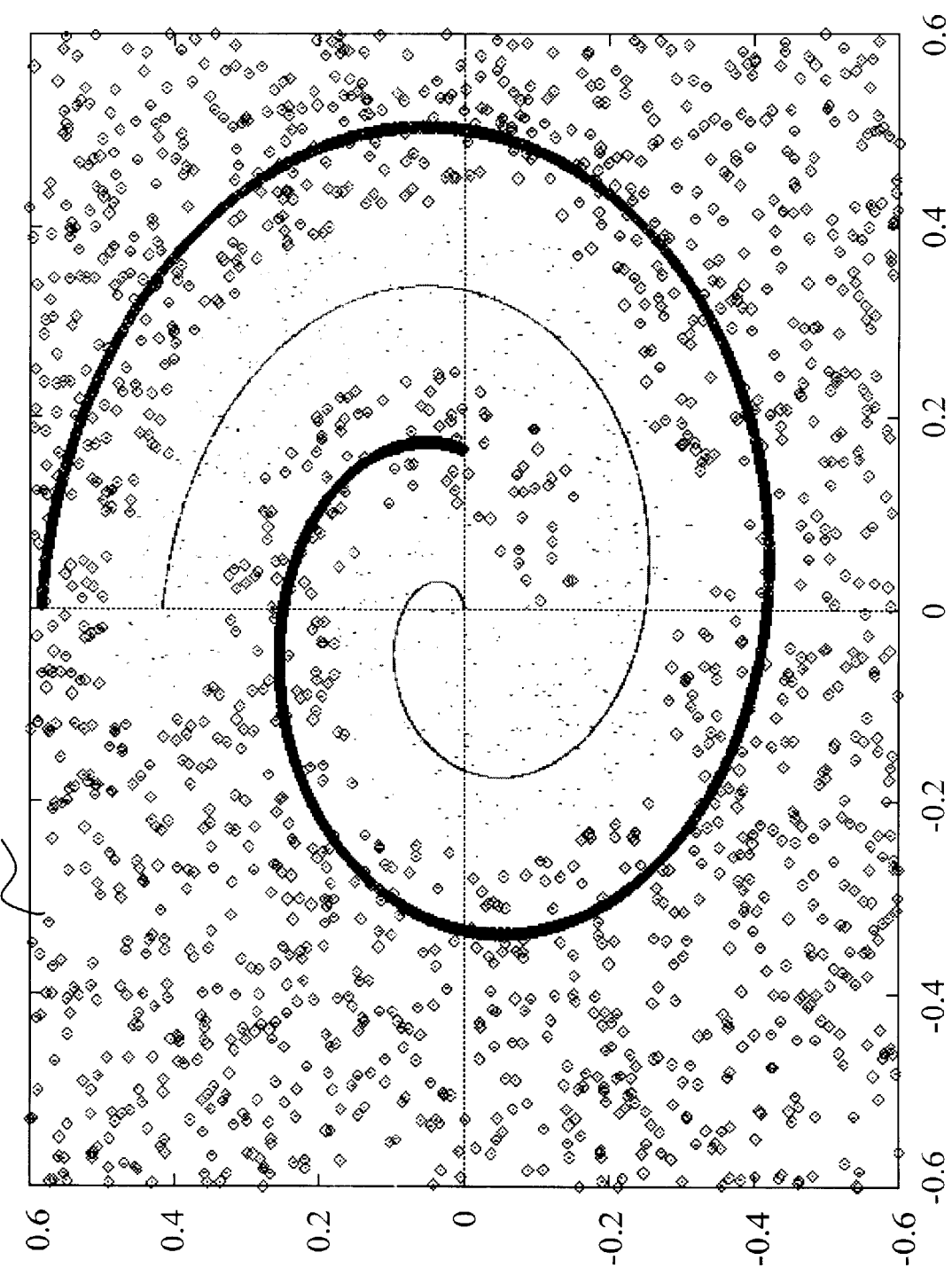

FIGS. 8a and 8b show the cluster groups at the top of the hierarchy, following seven epochs of processing. There are just two cluster 802a and 802b at this level, and they separately code for each of the two spiral manifolds, plus some of the noise vectors that have been linked in. At this level, in spite of the presence of continuous noise vectors between the spirals, the distinctness of the two manifolds has been discovered, and the data set has been partitioned between the two.

If necessary, the noise vectors could have been removed using a simple filter based on thresholding the input distance to cluster centers. Such filters are preferably executed between the encoding process 108 and the termination condition test 110. In this embodiment, the filters eliminate all but the few noise vectors, such as those that lie close to the spiral manifold.

SYSTEM ARCHITECTURE

Figure 9:
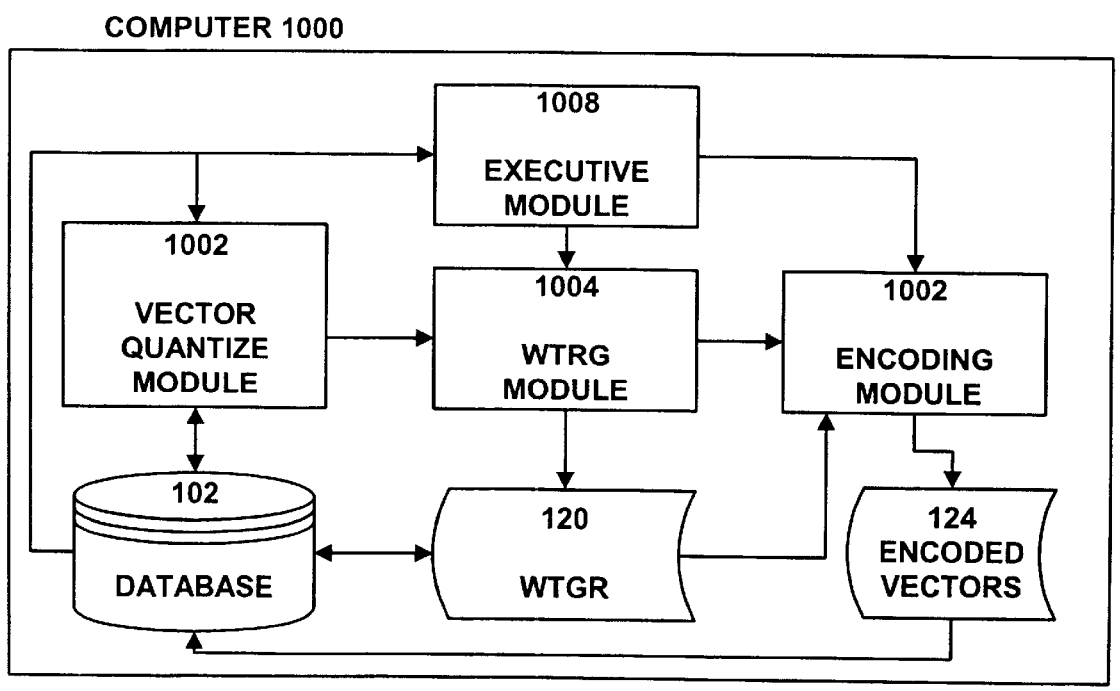
FIG. 9 is a high-level block diagram illustrating a system for unsupervised identification of data vectors.

Referring now to FIG. 9 there is shown an illustration of a system architecture for implementing an embodiment of the present invention. The system includes a computer 1000, having a processor, memory, input and output devices, and display apparatus. Suitable computers include Intel Inc. Pentium™ based computers executing Microsoft Corp.'s Window™ operating system, or Sun Microsystems, Inc. SPARCstations executing a UNIX™ based operating system.

Stored in memory of the computer 1000 are various software modules, which together form a software product implementing the unsupervised identification process 100 described above. These modules include a vector quantization module 1002, a weighted topology representing graph module 1004, and an encoding module 1006, which respectively implement the vector quantization process 108, the WTRG process 106, and the encoding process 108. An executive module 1008 manages the overall flow and iteration of epochs and output labeling of the clusters. Also stored in the memory is a database 102 of data items, preferably structured for useful representation as vectors. The database 102 may be relational database, where data items are defined by various tables, or an object oriented database, where each data item is defined by a respective object(s). Alternatively, a simple multidimensional array may be used to store the data items as vectors. Vectors created during the unsupervised learning process may be associated with the input data using various data identifiers and indices, or other referencing schemes. The memory further stores the weighted topology representing graphs 120 output by the WTRG module 1404. Finally, the memory stores the output vector set 124, shown here separately, but in practice persistently stored in the database 102.

APPLICATION EMBODIMENTS

The present invention may be usefully applied to a number of different applications to identify clusters of data without supervision. These various embodiments are now described.

In a first preferred embodiment, system 1000 and process 100 are configured to identify clusters of fraudulent transactions in various types of transaction processing data. In this first embodiment, the database 102 stores account data for transacting entities, and historical transactions for each such entity. A transacting entity may be consumer, a merchant, a patient, a doctor or medical services provider, a point of sale device, a computer, or any other entity which generates transactions for the purchase, sale, reimbursement, collection, or distribution of monies, good, or services. The transaction data items which are the data items being classified depends on the type of transacting entity.

Where the transacting entity is a consumer with a credit card account, the transaction data items are individual credit transactions. One useful set of variables for credit card transaction data items includes:

Expiration date for the credit card;
Dollar amount spent in each SIC (Standard Industrial Classification) merchant group category during a selected time period;
Percentage of dollars spent by a customer in each SIC merchant group category during a selected time period;

Number of transactions in each SIC merchant group category during a selected time period;
Percentage of number of transactions in each SIC merchant group category during a selected time period;
Categorization of SIC merchant group categories by fraud rate (high, medium, or low risk);
Categorization of SIC merchant group categories by customer types (groups of customers that most frequently use certain SIC categories);
Categorization of geographic regions by fraud rate (high, medium, or low risk);
Categorization of geographic regions by customer types;
Mean number of days between transactions;
Variance of number of days between transactions;
Mean time between transactions in one day;
Variance of time between transactions in one day;
Number of multiple transaction declines at same merchant;
Number of out-of-state transactions;
Mean number of transaction declines;
Year-to-date high balance;
Transaction amount;
Transaction date and time;
Transaction type.

Preferably, these variables are processed to generate various averages or rates of change before being applied to the processing methods of the present invention. Those of skill in the art will appreciate that a subset of these variables may used, or other variables may be substituted in this application. Where the transacting entity is a merchant with a merchant account and the transaction data items are credit card charges, the transaction data items may be similar, and include variables particular to the merchant.

Where the transacting entity is a point of sale device, such as terminal at a retail outlet, the transaction variables would include variables particular to both the transaction, such as the item being purchased, the amount, department, date, time, and so forth, and the current status of the point of sale device, such as device ID, location, current bill and change count, user identification of current operator, and the like.

In one embodiment the transaction data stored in the database 102 may be acquired through manual input as the transaction is being processed, or automated input via a network connection to a device where the transaction is being made, as is known in the art, particularly for point of sale transactions or credit card transactions. The particular way by which transaction data items are acquired is not material to the present invention.

In this embodiment then, the process 100 is applied to a set of transaction data items from the database 102. At least some of the data items presented would be known fraudulent transactions and known non-fraudulent transactions, with the intent being of identifying other transactions into one of these classifications. Processing continues through a successive number of epochs until a desired number of clusters is reached, preferably two (fraudulent, non-fraudulent) or three (fraudulent, non-fraudulent, and unknown/noise), though more clusters may be used. Examination of the transaction data items in the resulting clusters indicates which cluster contains the previously known fraudulent transactions, and the newly classified fraudulent transactions. Filtering may be applied to remove transactions that appear to be noise to improve the clustering.

IMAGE RECOGNITION BY INVARIANT FEATURE EXTRACTION

In pattern-recognition applications, the method can be utilized to learn a hierarchy of matched filters that are attuned to the statistics of the input data. The present invention may also be used for invariant feature extraction and solve the problem of converting natural sensory data into high-level symbolic form. For example, consider the problem of learning invariances in images. A given image defines a single point in the high-dimensional pixel space. The smooth transformations of this image defines a continuous manifold in this space: e.g. smoothly rotated versions of the image would define a nonlinear curve in the pixel space. Such a manifold can be learned by our algorithm, thereby representing the invariance manifold of the image. If a collection of images, with several examples of such transformations are used as the training input, one could in principle separate out the individual manifolds and classify images invariant to these transformations.

I claim:

1. A computer implemented method for unsupervised identification of associated sets of data items in a collection of data items without using labels encoded in the data items, the method comprising the operations of:

representing each data item by an input vector having a plurality of components representing portions of the data of the data item;

quantizing the plurality of input vectors by associating each input vector with a closest one of a number of cluster centers, the number of cluster centers less than the plurality of data items, each of the input vectors contributing to each cluster center;

linking the cluster centers with edges to form a graph, each edge between two cluster centers weighted according to a density of the input vectors between the two cluster centers;

encoding each input vector as an encoded vector having a coded vector component for each cluster center, each vector component determined as a function of a distance between the input vector and the respective cluster center, and a distance between the respective cluster center and a cluster center nearest the input vector;

repeating the operations of quantizing, linking, and encoding using the encoded vectors as the input vectors until a termination condition is satisfied; and for each encoded vector remaining after the termination condition is satisfied, labeling the data item associated with the encoded vector with a label associated with nearest cluster center.

2. The method of claim 1, wherein quantizing the plurality of input vectors further comprises:

adjusting each cluster center as a function of a distance of the cluster center to each of the input vectors.

3. The method of claim 1, wherein quantizing the plurality of input vectors further comprises:

selecting a number of the input vectors as cluster centers; and updating each cluster center to a mean of its distance to each input vector.

4. The method of claim 3, wherein updating each cluster center to a mean of its distance to each input vector further comprises:

for each input vector:

determining a distance of the input vector to each cluster center;

ranking the cluster centers by their distance to input vector;

updating a partial sum vector of each cluster center using the input vector and the ranking to the cluster center;

updating an exponentially decayed contribution of the input vector to each cluster center using the ranking of the cluster center; and updating each cluster center to the mean of the partial sum vectors for the cluster center.

5. The method of claim 1, wherein linking the cluster centers with edges to form a graph, each edge between two cluster centers weighted according to a density of the input vectors between the two cluster centers, further comprises:

for each edge between two cluster centers, weighting the edge as a function of a number of input vectors for which the two clusters are the closest cluster centers to each of the number of input vectors.

6. The method of claim 1, wherein linking the cluster centers with edges to form a graph, each edge between two cluster centers weighted according to a density of the input vectors between the two cluster centers, further comprises:

for each edge between two cluster centers:
determining a number of input vectors for which the two cluster centers are the closest cluster centers to each of the input vectors;
establishing a weight of the edge as an inverse of the determined number of input vectors.

7. The method of claim 1, wherein encoding each input vector as an encoded vector further comprises:

encoding each input vector with an output code:

$$O_k = e^{-(r_k + \alpha \cdot p_{kq})/\tau} \qquad (4)$$

where $O_k$ is the output code for a k-th cluster center;

$r_k$ is a distance rank of the k-th cluster center to the input vector being encoded;

$\alpha$ is a weighting parameter;

$p_{kq}$ is a length of a shortest path in the graph from a cluster center closest to the input vector being encoded to the k-th cluster center; and $\tau$ is a decay parameter.

8. The method of claim 1, wherein the distance between the input vector and the respective cluster center vector is a distance rank, and the distance between the respective cluster center and the cluster center nearest the input vector is a distance rank.

9. A computer implemented method for identifying clusters of associated data items in a database containing N data items, without using encoded labeling information in the data items, the method comprising the operations of:

representing each data item by an input vector V having a plurality of components representing portions of the data of the data item;

selecting a subset of K input vectors as cluster centers C, where K<N;

updating each cluster center $C_k$ (k=1 to K) as a function of a distance of each vector $V_n$ (n=1 to N) to the cluster center $C_k$;

linking the cluster centers C with edges to form a graph, each edge between two cluster centers $C_i$ and $C_j$ weighted according to a density of the vectors V between the two cluster centers $C_i$ and $C_j$;

encoding each input vector V with an output code $O_k$ for each cluster center $C_k$ to form an encoded vector V', the output code $O_k$ for each cluster center $C_k$ determined as function of a distance of the cluster center $C_k$ to the input vector V and a shortest path from the cluster center $C_k$ to a cluster center $C_o$ nearest the input vector V;

repeating the selecting, linking, and encoding operations using the encoded vectors V' as the input vectors V until a termination condition is satisfied; and for each encoded vector V', labeling the data item represented by the encoded vector V with a label associated with the nearest cluster center $C_o$.

10. A computer implemented method for unsupervised identification of associated sets of data items in a collection of data items without use of labeling information encoded in the data items, the method comprising the operations of:

representing each data item by an input vector having a plurality of components representing portions of the data of the data item;

quantizing the plurality of input vectors by associating each input vector with a closest one of a number of cluster center vectors, the number of cluster center vectors less than the plurality of data items, each of the input vectors contributing to each cluster center vector;

forming a graph by:
associating pairs of cluster center vectors with an edge, such that each cluster center vector is associated with at least one other cluster center vector; and
weighting each edge between a pair of cluster center vectors as a function of a number of input vectors to which the pair of cluster center vectors are the closest cluster center vectors;

encoding each input vector as an encoded vector having a coded vector component for each cluster center vector, each vector component determined as a function of a distance of the input vector to the respective cluster center vector and a shortest path in the graph from the respective cluster center vector to a cluster center vector nearest the input vector;

repeating the operations of quantizing, forming, and encoding using the encoded vectors as the input vectors until a termination condition is satisfied; and for each encoded vector remaining after the termination condition is satisfied, labeling the data item associated with the encoded vector with a label defined for the cluster center vector nearest the encoded vector.

11. A computer implemented method for unsupervised identification of associated sets of data items in a collection of data items without use of labeling information encoded in the data items, the method comprising the operations of:

representing each data item by an input vector having a plurality of components representing portions of the data of the data item;

quantizing the plurality of input vectors by associating each input vector with one of a number of cluster center vectors, the number of cluster center vectors less than the plurality of data items, each cluster center vector having components determined as a function of a distance of the cluster center vector to each of the plurality of input vectors;

linking pairs of cluster center vectors with edges to form a graph, each edge between a pair of cluster center vectors weighted as a function of a number of input vectors to which the pair of cluster center vectors are the closest cluster center vectors;

encoding each input vector as an encoded vector having a vector component for each cluster center vector, each vector component determined according to a relationship between the input vector and the cluster center vector and a relationship between the cluster center vector and a cluster center vector closest to the input vector;

repeating the operations of quantizing, linking, and encoding using the encoded vectors as the input vectors until a termination condition is satisfied; and for each encoded vector remaining after the termination condition is satisfied, labeling the data item associated with the encoded vector with a label defined for the cluster center vector nearest the encoded vector.

12. A computer system for unsupervised identification of associated sets of data items in a collection of data items without use of labeling information encoded in the data items, the system comprising:

a database containing a plurality of data items, each data item associated with a vector having a plurality of components representing portions of the data of the data item;

a quantizing module coupled to the database to receive the plurality of input vectors and associate each input vector with one of a number of cluster center vectors, the number of cluster center vectors less than the plurality of data items, each cluster center vector having components determined as a function of a distance of the cluster center vector to each of the plurality of input vectors;

a graph module coupled to the quantizing module to form a graph by linking pairs of cluster center vectors with edges, and to weight each edge between a pair of cluster center vectors as a function of a number of input vectors to which the pair of cluster center vectors are the closest cluster center vectors;

an encoding module coupled to the graph module and the database to encode each input vector as an encoded vector having a vector component for each cluster center vector, and to determine each vector component according to a relationship between the input vector and the cluster center vector and a relationship between the cluster center vector and a cluster center vector closest to the input vector; and an executive module that iteratively inputs the encoded vectors to the quantizing module as the input vectors until a termination condition is satisfied, and that labels the data item associated with the encoded vector with a label defined for the cluster center with which the encoded vector is associated.

13. A computer system for unsupervised identification of associated sets of data items in a collection of data items without use of labeling information encoded in the data items, the method comprising the operations of:

means for representing each data item by an input vector having a plurality of components representing portions of the data of the data item;

means for quantizing the plurality of input vectors by associating each input vector with a closest one of a number of cluster center, the number of cluster center less than the plurality of data items, each of the input vectors contributing to each cluster center;

means for linking the cluster centers with edges to form a graph, each edge between two cluster centers weighted according to a density of the input vectors between the two cluster centers;

means for encoding each input vector as an encoded vector having a coded vector component for each cluster center vector, each vector component determined as a function of a distance between the input vector and the respective cluster center vector, and a distance between the respective cluster center and a cluster center nearest the input vector;

means for repeating the operations of quantizing, forming, and encoding using the encoded vectors as the input vectors until a termination condition is satisfied; and means for labeling a data item associated with an encoded vector remaining after the termination condition is satisfied, with a label associated with nearest cluster center to the encoded vector.

* * * * *

UNITED STATES PATENT AND TRADEMARK OFFICE
CERTIFICATE OF CORRECTION

PATENT NO.    : 6,226,408 B1
DATED         : May 1, 2001
INVENTOR(S)   : Joseph Sirosh et al.

It is certified that error appears in the above-identified patent and that said Letters Patent is hereby corrected as shown below:

Column 1,
Line 4, please insert -- This invention was made with Government support under Contract No. N66001-97-C-8536, awarded by the United States Department of the Navy. The Government has certain rights in this invention --.

Signed and Sealed this

Twenty-sixth Day of March, 2002

Attest:

JAMES E. ROGAN
*Attesting Officer*                    *Director of the United States Patent and Trademark Office*